US007675813B2

(12) United States Patent
Valero et al.

(10) Patent No.: US 7,675,813 B2
(45) Date of Patent: *Mar. 9, 2010

(54) METHODS AND SYSTEMS FOR DETECTING ARRIVALS OF INTEREST

(75) Inventors: Henri-Pierre Valero, Belmont, MA (US); Mauricio Tejada, Kanagawa-Ken (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/186,533

(22) Filed: Aug. 6, 2008

(65) Prior Publication Data

US 2008/0285382 A1    Nov. 20, 2008

Related U.S. Application Data

(63) Continuation of application No. 10/819,362, filed on Apr. 6, 2004, now Pat. No. 7,423,930.

(60) Provisional application No. 60/528,536, filed on Dec. 10, 2003.

(51) Int. Cl.
*G01V 1/40* (2006.01)
(52) U.S. Cl. .............................. 367/27; 367/30; 367/34
(58) Field of Classification Search ............. 367/27–30, 367/34
See application file for complete search history.

(56) References Cited

U.S. PATENT DOCUMENTS

| 4,446,540 | A | 5/1984 | Zimmer |
| 4,562,556 | A | 12/1985 | Ingram et al. |
| 4,797,668 | A | 1/1989 | Zimmer |
| 4,951,266 | A | 8/1990 | Hsu |
| 5,058,078 | A | 10/1991 | Eyl et al. |
| 5,587,966 | A | 12/1996 | Kimball et al. |
| 5,594,706 | A | 1/1997 | Shenoy et al. |
| 5,661,696 | A | 8/1997 | Kimball et al. |
| 5,742,740 | A | 4/1998 | McCormack et al. |
| 5,747,750 | A | 5/1998 | Bailey et al. |

(Continued)

FOREIGN PATENT DOCUMENTS

| EP | 0 424 271 | 4/1991 |
| WO | 00/31568 | 6/2000 |

OTHER PUBLICATIONS

M.E. Asiala, A. Navarro, "Study of Extreme Values and Influential Observations", Proceedings of the Survey Research Methods Section, American Statistical Assoc. (2000), pp. 521-526.
E. Fishier, H. Messer, "On the Use of Order Statistics for Improved Detection of Signals by the MDL Criterion", IEEE Trnas. on Signal Processing, vol. 48, No. 8, Aug. 2000, pp. 2242-2247.

(Continued)

*Primary Examiner*—Scott A Hughes
(74) *Attorney, Agent, or Firm*—Matthias Abrell; Jody DeStefanis; Jeff Griffin

(57) ABSTRACT

Methods and systems for taking measurements related to subterranean formations. The methods and systems provide robust, reliable first arrival data for component signals of interest, which may be used to estimate formation slowness, characterize formation slowness zones, or act as an input to other processes. The methods and systems are capable of automatically providing good first arrival data based on signals received without any human interaction, and without setting or changing any parameters.

10 Claims, 16 Drawing Sheets

U.S. PATENT DOCUMENTS

| | | | |
|---|---|---|---|
| 5,771,170 | A | 6/1998 | Withers et al. |
| 5,886,303 | A | 3/1999 | Rodney |
| 5,924,499 | A | 7/1999 | Birchak et al. |
| 5,987,385 | A | 11/1999 | Varsamis et al. |
| 6,188,643 | B1 | 2/2001 | Liang et al. |
| 6,205,087 | B1 | 3/2001 | Fukuhara et al. |
| 6,236,942 | B1 | 5/2001 | Bush |
| 6,308,137 | B1 | 10/2001 | Underhill et al. |
| 6,449,560 | B1 | 9/2002 | Kimball |
| 6,510,104 | B1 | 1/2003 | Ikegami |
| 6,614,360 | B1 | 9/2003 | Leggett et al. |
| 6,807,489 | B2 | 10/2004 | Naville et al. |
| 6,837,332 | B1 | 1/2005 | Rodney |
| 6,868,038 | B2 | 3/2005 | Leaney |
| 2003/0086335 | A1 | 5/2003 | Naville et al. |
| 2003/0168213 | A1 | 9/2003 | Harmon et al. |
| 2003/0206486 | A1 | 11/2003 | Valero et al. |
| 2004/0006430 | A1 | 1/2004 | Harmon et al. |

OTHER PUBLICATIONS

A.P. Liavas, P.A. Regalia, "On the Behavior of Information Theoretic Criteria for Model Order Selection", IEEE Trans. on Signal Processing, vol. 49, No. 8, Aug. 2001, pp. 1689-1695.

S. Franklin, M. Brodeur, "A Practical Application of a Robust Multivariate Outlier Detection Method", Proceedings of the Survey Research Methods Section, ASA (1997), pp. 186-191.

M. Baer, U. Kradolfer, "An Automatic Phase Picker for Local and Teleseismic Events", Bulletin of the Seismological Soc. of America, vol. 77, No. 4 pp. 1437-1445, Aug. 1987.

G. Kitagawa, H. Akaike, "A Procedure for the Modeling of Non-Stationary Time Series", Ann. Inst. Statist Math. 30 (1978), Part B, pp. 351-363.

A.F. Kushnir, V.M. Lapshin, V.I. Pinsky, J. Fyen, "Statistically Optimal Event Detection Using Small Array Data", Bulletin of the Seismological Soc. of America, vol. 80, No. 6, pp. 1934-1950, Dec. 1990.

R. Allen, "Automatic Phase Pickers: Their Present Use and Future Prospects", Bulletin of the Seismological Soc. of America, vol. 72, No. 6, pp. S225-S242, Dec. 1982.

F. Boschetti, M.D. Dentith, R.D. List, "A fractal-based algorithm for detecting first arrivals on seismic traces", Geophys. vol. 61, No. 4, pp. 1095-1102.

J.B. Molyneux, D.R. Schmitt, "First-break timing: Arrival onset times by direct correlation", Geophys. vol. 64, No. 5, pp. 1492-1501.

Zhang, et al. "Automatic P-wave arrival detection and picking with multiscale wavelet analysis for single-component recordings.", Department of Geology and Geophysis, Univ. of Wisconsin-Madison, Jun. 19, 2002.

Peason, Ronald K. "Outliers in Process Modeling and Identification", IEEE Transactions on Contrl Systems Technology, vol. 10, No. 1, Jan. 2002.

Tjostheim, Dag, "Autoregressive Modeliing and Spectral Analysis of Array Data in the Plane", IEEE Transactions on Geoscience and Remote Sensing, vol. GE-19, No. 1, Jan. 1981.

METHODS AND SYSTEMS FOR DETECTING ARRIVALS OF INTEREST

CROSS REFERENCE TO RELATED APPLICATIONS

This application is a continuation of U.S. patent application Ser. No. 10/819,362 filed Apr. 6, 2004, which claimed priority of U.S. Provisional Patent Application Ser. No. 60/528,536 filed 10 Dec. 2003. Both of the U.S. patent application and U.S. Provisional Patent Application are hereby incorporated in its entirety by this reference.

FIELD OF THE INVENTION

The present invention relates generally to methods and systems for investigating subsurface formations using acoustic or electromagnetic measurements made in a borehole. More particularly, this invention is directed to methods and systems for automatically detecting arrivals of components of interest.

BACKGROUND OF THE INVENTION

The generation and recording of borehole acoustic waves is a key measurement employed in oilfield borehole logging. Many borehole tools and methods are currently available for taking acoustic measurements. Some tools include a single source of sonic waves and two or more receivers, however, most of the tools now include two or more acoustic sources and many receivers arranged in an array. While the currently available acoustic tools are useful in providing a large range of information regarding the surrounding formation and the borehole parameters, a primary use of acoustic borehole measurements is the estimation of compressional wave and shear wave formation slowness.

Compressional wave formation slowness is typically estimated using travel times acquired via a first motion detection process. In the case of a single source, two receiver tool suggested by the prior art, formation slowness is estimated by subtracting the arrival times between two receivers and dividing by the inter-receiver spacing. This estimate, however, is subject to inaccuracies due to tool tilt, borehole washouts, bed boundary effects, etc. Additional acoustic sources and receivers and more robust methods such as STC (Slowness-Time-Coherency analysis) and semblance processing, among others, have been used to reduce the inaccuracies introduced by such environmental effects.

Semblance processing can produce very accurate slowness values for a subterranean formation, but it is quite expensive. Semblance processing generally requires the acquisition (and, if processing takes place at the well site, communication uphole) of "long" waveforms. The speed of a logging operation is often hindered by the time it takes to gather long waveform segments and telemeter all the data from the downhole position to surface equipment.

While semblance processing provides reliable slowness estimates, it requires significant computer resources and the acquisition of long waveforms. Many well developers, however, are primarily interested in compressional slowness values. Therefore, recording just the first break of the compressional wave could be enough to obtain compressional slowness very quickly. The first arrival signals may then be used to generate formation slowness estimates. However, current methods of detecting first arrival signals of interest do not result in useful results without a skilled operator monitoring and changing dozens of parameters as the logging tool traverses a borehole. The necessity of changing parameters is typically a result of variations in the formation. Highly skilled operators with the expertise necessary to adjust the logging collection parameters and processing techniques are very expensive. Many logging applications would benefit from a reliable, less expensive logging technique, especially a logging method that reduces or eliminates the number of parameters that must be adjusted during a logging operation.

The present invention is directed to overcoming, or at least reducing the effects of, one or more of the problems outlined above.

SUMMARY OF THE INVENTION

The present invention meets the above-described needs and others. Specifically, the present invention provides methods and systems for taking measurements relating to subterranean formations, and preferably for logging subterranean formations. The methods and systems provide robust, reliable first arrival data for component signals of interest, which may be used to estimate formation slowness, characterize formation slowness zones, or act as an input to other processes. The methods and systems are capable of automatically consistently detecting first arrival data based on signals received without any human interaction, and without setting or changing any parameters even if the component signal of interest is relatively weak as compared with noise. Prior logging techniques, especially those based on first arrival data, require an experienced operator to set and change dozens of parameters in order to generate good first arrival data that can be used to estimate formation slowness.

The present invention generates good first arrival data automatically and is not dependent on any initial or changing parameters. According to some aspects, the methods and systems take measurements at a plurality of locations of a subterranean formation and automatically detect first arrival data of a component signal of interest. Applying principles of the invention, consistent first arrival detection is accomplished without human intervention during a logging operation, even on waveforms with weak signal to noise ratios. For example, according to the present invention, first arrivals of component signals of interest portions of the waveform are consistently detected when the signal to noise ratio of the component signal of interest versus the noise portion of the waveform is 10 dB or less, 5 dB or less, or even 3 dB or less.

According to some aspects, the automatic detection of first arrivals is accomplished by receiving waveforms including the component signal of interest, generating a window around a portion of the waveform containing a first arrival of the component signal of interest, and finding a point along the waveform and within the window where before and after the point are two different component signals. The point before and after which there are two different component signals may be determined using statistical analysis of the waveform. The two different component signals may include a noise portion and the component signal of interest portion.

According to some aspects, the automatic detection of first arrivals is facilitated by defining a zone containing a first arrival of the component signal of interest based only on the waveform data. The defining may comprise calculating an energy ratio for the waveform data and multiplying the energy ratio by a damping function to reduce or eliminate the effect of strong late arrivals.

According to principles of the invention, first arrival data results may be made more reliable by eliminating first arrival outliers prior to reporting final first arrival data. According to some aspects of the invention, a Zscore is computed following detection of all first breaks in a waveform array, and first arrival data outliers are eliminated by comparing the Zscore to a threshold and eliminating each first arrival detected with a Zscore above or equal to the threshold. However, there may be an intermediate step of redetecting each first arrival with a Zscore above the threshold at least once before eliminating the outlying arrival. Nevertheless, after a predetermined number of redetections, which may be as few as zero, one, or two, first arrivals with a Zscore above the threshold are thrown out. Further, for any redetections, instead of using only received waveform data to window the waveform, a new window expected to contain the first arrival signals may be calculated based on a frequency of arrival signals.

According to some aspects, first arrival data is despiked. Despiking may comprise calculating a Zscore for first arrivals detected by a receiver at multiple depths, comparing the Zscore to a threshold, eliminating first arrivals with Zscores equal to or greater than the threshold, and interpolating between first arrivals with Zscores below the threshold.

Another aspect of the invention provides a method of logging comprising generating acoustic waves with a source, receiving acoustic waveforms with a plurality of receivers, automatically calculating a window for one of the acoustic waveforms containing a first break of a component signal of interest, and automatically detecting the first break location of the component signal of interest within the window. The automatically calculating a window may comprise generating a localization function based on the received acoustic waveforms. According to some embodiments, the localization function is an energy ratio for an acoustic waveform multiplied by a damping term to suppress late arrivals.

Another aspect of the invention provides a method of logging comprising generating acoustic waves, receiving acoustic waveforms, automatically detecting a first motion location of a component signal of interest for each of the acoustic waveforms, and automatically quality checking the first motion locations. The automatic quality checking may include computing a Zscore following detection of all first breaks in a waveform array, comparing the Zscore to a threshold, redetecting each first motion location detected with a Zscore above or equal to the threshold, where the redetecting comprises generating a new window of expected first motion signals based on a frequency of received acoustic signals and not on first motion location data, redetecting for first motion, comparing the each redetected first motion location to the threshold, and eliminating each redetected first motion location with a Zscore above or equal to the threshold.

Another aspect of the invention provides methods and systems of finding first arrivals in a waveform. The methods and systems may automatically define a window containing the first arrival around a portion of the waveform according to a first algorithm using the waveform itself as an input. Subsequently, the methods and systems may automatically detect the first arrival within the window according to a second algorithm. The first algorithm may comprise the product of an energy ratio of the waveform and a regularization function to damp high energy late arrivals. The second algorithm may apply statistical analysis to the windowed interval of the waveform to find a point before and after which contain two different signals.

Another aspect of the invention may include methods and systems of logging with a logging tool comprising generating acoustic waves, receiving acoustic waveforms, automatically detecting first breaks of a component signal of interest even when the signal-to-noise ratio of the component signal of interest versus noise is 10 dB or less, and estimating slowness based on the first break travel times and intra-receiver spacing of the logging tool. The methods and systems for logging may include characterizing slowness for zones of a formation based on the slowness estimate, and semblance processing the acoustic waveforms accounting for the zone slowness characterization. According to some aspects, the slowness categorization is broken into one of five general slowness categories.

Another aspect of the invention provides methods and systems for characterizing slowness in a semblance processing logging operation comprising automatically detecting first arrival data of a component signal of interest without intervention during a logging operation, where waveforms from which the automatically detected first arrival data is detected comprise a signal of interest to noise ratio of a component signal of interest versus noise is 10 dB or less.

Another aspect of the invention provides a logging system comprising an acoustic tool having a source and a plurality of receivers mounted thereon, a computer in communication with the acoustic tool, and a set of instructions executable by the computer that, when executed, automatically consistently detects first arrivals of a component signal of interest even from acoustic waveforms having a signal-to-noise ratio of 10 dB or less. The set of instructions may comprise instructions to calculate a localization function window around a portion of the acoustic waveform received by the receivers based on data contained in the acoustic waveform, the window containing the location of the first arrival of the component signal of interest, and to define the location of the first arrival of the component signal of interest within the window at a point within the window wherein before and after the point there are two different component signals using statistical analysis.

Another aspect of the invention provides a system comprising a measurement system, preferably a logging tool, capable of consistently detecting first motion of a component signal of interest from measurements having a noise portion and a component signal of interest portion, where the component signal of interest portion is relatively weak compared with the noise portion. For example, the logging tool may be able to consistently detect first motion from measurements having a signal-to-noise ratio of the component signal of interest versus noise of 10 dB or less, 5 dB or less, or even 3 dB or less.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain the principles of the present invention.

FIG. 1A is a waveform, FIG. 1B illustrates application of the standard energy ratio to the waveform of FIG. 1A, and FIG. 1C illustrates application of a localization function of the present invention to the waveform of FIG. 1A.

Throughout the drawings, identical reference numbers designate similar, but not necessarily identical, elements.

DETAILED DESCRIPTION OF THE PREFERRED EMBODIMENTS

Figure 1A:
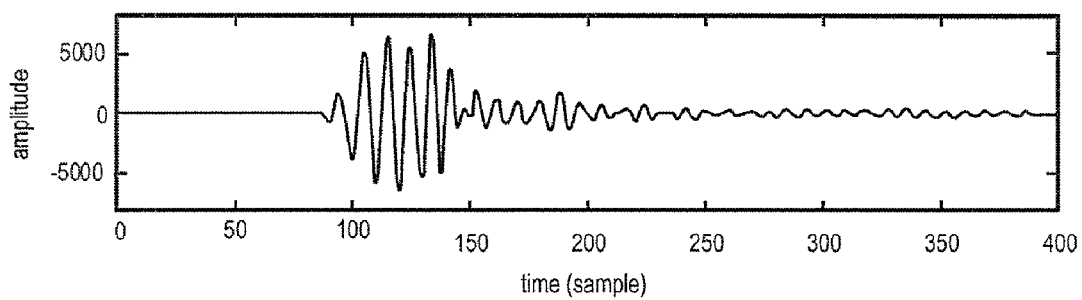
FIGS. 1A-1C illustrate a waveform and a comparison between detecting arrivals by standard energy ratio computations and a localization function of the present invention.

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

The present invention contemplates automatic detection of first arrivals or first breaks of a component signal of interest. As mentioned above, historically, first arrivals could only be accurately detected by employing numerous parameters that must be adjusted during a logging operation. Prior to the principles described herein, an accurate log of first arrival data could not be done automatically. The present invention provides methods and systems for logging a subterranean formation by automatically detecting first arrivals of component signals of interest, producing good first arrival data that can be used to estimate formation slowness. The methods and systems may be particularly well suited to acoustic wellbore logging with a sonic logging tool. However, the methods and systems presented herein are not so limited. For example, the methods and systems may be applied to resistivity logs, vertical seismic profiles, check-shot surveys, or other applications such as logging while drilling (LWD), measurement while drilling (MWD), permanent monitoring, semi permanent monitoring, fracture monitoring (including hydrofrac monitoring), temperature monitoring and pressure monitoring. In a broader sense, the techniques described herein can also be applied measurements relating to subterranean hydrocarbon reservoirs such as surface seismic applications on land, marine or in a transition zone. In addition, those skilled in the art having the benefit of this disclosure will understand that the first arrival data can be useful with many types of processing, including, but not limited to: zoning in BDT (Best DT software available from Schlumberger), iconic processing, high resolution slowness logging, etc.

As used throughout the specification and claims, the terms "first break," "first arrival," and "first motion" refer to the earliest arrival of energy propagated from an energy source to a receiver in a wellbore. The energy source may be downhole, or it may be at a surface. "Logging" means to record a measurement versus depth or time, or both, of one or more physical quantities in or around a well and includes, but is not limited to: acoustic logging, resistivity logging, vertical seismic profiles, check-shot surveys, logging while drilling (LWD), measurement while drilling (MWD), permanent monitoring, semi permanent monitoring, fracture monitoring (including hydrofrac monitoring), temperature monitoring and pressure monitoring. "Automatic" means capable of producing a desired result without human intervention, or without any initial or changing parameters. "Consistently detect" refers to reliably and steadily detecting such that subsequent processing techniques can be directly applied to the data and/or such that the data can to some degree be processed at a well site without the cost or time delay of sending the data to a processing center. The words "including" and "having," as used in the specification, including the claims, have the same meaning as the word "comprising." The word "acoustic" includes both frequencies of conventional sonic tools, as well as those used in seismic tools and applications.

According to principles described below, first arrival or motion detecting methods and systems automatically provide fast, accurate, reliable results with little or no user input parameters. The methods and systems are also robust and work in most or all downhole situations. As mentioned above, in the past, first motion detection required dozens of input parameters to provide accurate first motion data, many or all of which are not always obvious to set. Many different parameters associated with current first arrival techniques are not always related to intuitive physics and therefore it is very difficult to generate good first arrival data without the aid of an expensive expert. Accordingly, methods and systems for providing good first motion information without operator intervention are discussed below. Details of a method of detecting first breaks are discussed first for a single waveform, followed by discussion of the use of array information to detect first breaks. However, according to principles of the present invention, the methods may be applied principally to individual waveforms, without requesting information from a full array and without using any external information to reduce computer processing resources needed.

Before applying any methods to waveform data, it may be important to analyze the quality of the waveforms themselves. That is, it can be important to detect waveforms that contain excessive noise, spikes or other features that tend to induce problems when the waveform data is processed. Therefore, according to some aspects of the invention, waveforms are quality checked before they are processed for first arrival data and slowness estimates. However, it is desirable to have quality indicators available at the well site, and that the quality checks be robust without requiring much in the way of computing resources. According to some aspects of the present invention, several different quality checking methods may be applied to waveform data, including, but not limited to: detection of inconsistent waveforms in an array; detection of clipped waveforms; detection of excessive noise in the waveforms; and detection of spikes in the waveform. Each of these methods is described in some detail below.

An inconsistent waveform is a waveform that is significantly different from the others. An inconsistent waveform may have a high or low amplitude as compared to the others in an array, it may have a different shape, etc. Inconsistent waveforms can have an adverse affect and significantly decrease the coherence of first motion detection data. Therefore, according to some aspects of the present invention inconsistent or "bad" waveforms are deselected prior to processing.

According to some aspects of the present invention, a "reference waveform" is defined and compared to each individual waveform in an array. Consider a signal s(t) of length L, where t is the time variable and S(k) its Fourier transform. The waveform array is defined as $A_M(k)=S_1(k) \cup S_2(k), \ldots S_M(k)$ where M is the number of array waveforms. The "reference waveform" is considered as the median of the waveforms contained in the array:

$$rf_w(k) = \text{reference\_waveform} = \text{median}[A_M(k)] \quad (1)$$

After defining a reference waveform, each individual waveform may be compared to and evaluated against the reference waveform. Ideally, a multi-coherence analysis of the array waveform may be performed, however, such a computation may be too expensive for well-site implementation and therefore use of the reference waveform is currently preferable. Following calculation of the reference waveform, a coherence ratio is computed for each individual waveform in the array as:

$$C_i = \frac{\left(\sum_{k=1}^{L} S_i(k)\_rf_w(k)\right)^2}{2\sum_{k=1}^{L} S_i^2(k) + rf_w^2(k)} \quad (2)$$

According to some aspects of the invention, a waveform is considered inconsistent if $C_i$ is less than a predetermined threshold. For example, a waveform is considered inconsistent if $C_i < \gamma$. $\gamma$ is based on a model described below. Considering an array of sonic waveforms computed using a modeling program (e.g. Green 3D), one waveform is perturbed randomly in order to find the effect on semblance analysis. For each realization of this process, reference traces are computed along with a coherence value for each waveform. The result of this analysis shows that the criterion of equation (2) indicates bad waveforms when $C_i < \gamma$ and $\gamma$ is approximately 0.35.

Clipped waveforms may also present problems to processing waveform arrays. A "clipping" effect is usually due to signal amplitude that saturates the electronics, inducing a truncature in the recorded waveform. Clipped waveforms can be relatively easy to detect, as they are "flat" at several consecutive samples and often correspond to a maximum amplitude the electronics can detect. Accordingly, one way to detect clipped waveforms is to compare the amplitude of recorded waveform signals to the limits of a hardware recorder. However, this detection approach is dependent on the hardware used, and the limits of the hardware are not always known to a local user or a computing center.

Therefore, according to some aspects of the present invention clipped waveforms are detected independent of the hardware used to record the waveforms. Considering a signal s(t) of length L where t is the time, a first point comprises an evaluation of a global maximum of the waveform signal. It is possible that several samples in the waveform signal each have the maximum value. Therefore it is necessary to discriminate the signals of maximum value from samples related to direct current (DC). Because the portion of the waveform that is clipped will have a constant value equal to the maximum of the signal, a clipped waveform is defined by:

$$Clipp = \left(\frac{\partial}{\partial t} s(t)\right)_{t=max[s(t)]} = 0 \quad (3)$$

According to equation (3), if several consecutive samples are the same and equal, there is a clipped portion of the waveform. Equation (3) may also be applied to an entire waveform sample and not only to points of maximum amplitude. Equation (3) enables the identification of clipped waveforms and gives indication that perhaps a wrong sampling of data has been made while recording the information.

Excessive noise in a waveform may also be detected according to some aspects of the present invention. Considering a signal s(t) of length L where t is the time, a signal-to-noise ratio (SNR) of the waveform is evaluated to determine whether or not the waveform will be useful for future processing. A ratio between the signals measured before and after an expected first arrival is calculated. This standard approach provides a generally good estimate of SNR of the considered waveform under the assumption of white Gaussian noise. Mathematically, the following quantity is calculated:

$$\text{noise} = \frac{\int_0^\tau s^2(t)\,dt}{\int_\tau^L s^2(t)\,dt} \quad (4)$$

where L is the total duration of the signal and $\tau$ is the time position that separates the part of the waveform signal related to the noise ($[0,\tau]$) from the part of the signal related to the signal of interest ($[\tau+1,L]$). The time position $\tau$ is evaluated as Tr*slowness_min where Tr is defined as the distance between the transmitter and the considered receiver. The slowness_min corresponds to the speed before which no arrival can arrive to the considered sensors. In the case of monopole signals, slowness_min is approximately 40 μs/ft.

Use of the relations above enables implementation of real time processing, which is important for well site computation of slowness. After calculating the ratio of equation (4), the signal-to-noise ratio is computed as:

$$\text{SNR} = 20\log_{10}(\text{noise}) \quad (5)$$

Calculating an estimate of the SNR of the waveform, it is a simple process to determine whether the waveform will be useful for processing or not. According to some aspects of the invention, a waveform with a SNR less than or equal to 3.0 is considered a bad waveform, although the according to some embodiments a SNR of 2.0 or less may sometimes be considered good. Accordingly, one aspect of the invention employs a method of quality checking by calculating a SNR for each waveform and eliminating waveforms with a SNR less than or equal to 3.0. Moreover, consistency of the SNR across the waveform array is also a quality indicator of consistency of the recorded data.

It may also be desirable to screen waveform data for spikes. A spike is ideally considered as an addition of a Dirac function to an original signal, with an amplitude equal to at least the maximum of the original signal. Therefore, a spike may be detected as an arrival of an event with an amplitude higher than another part of the signal. To detect such a spike, a metric function providing the position and the amplitude of the spike arrival is defined. It is important to know the position of the spike in the waveform, because it is possible to correct the spike by simple interpolation, for example.

Considering a signal s(t), a criterion that may be used according to the present invention to detect a spike in a waveform requiring very little computer resources is defined as follows:

$$Criterion = \frac{\int_\tau^{\tau+T} s^2(t)\,dt}{\int_{\tau-T}^{\tau} s^2(t)\,dt - \alpha \int_0^L s^2(t)\,dt} \tag{6}$$

where T is the size of a window, L is a length of the signal, and α is a regularization factor. The size of the window T is the same as that used for an integration window commonly used for semblance processing and is therefore variable depending on the considered wave mode. Criterion (6) uses the well-known energy ratio and energy function computation. The Criterion (6) detects different arrivals present in the waveform signal. When an unexpected signal arrives in the waveform, the Criterion (6) shows an increase in amplitude indicating the presence and position of a potential spike in the analyzed waveform signal.

Once a potential spike in the waveform signal data has been located, the amplitude of the current data sample is considered and compared with the rest of the waveform. Therefore, two windows before and after the point of interest may be selected and a statistical test performed within the windows in order to determine whether the point of interest is a spike or not. For example, the statistical test described in detail below with reference to FIG. 5, may be used to determine whether or not to throw out the detected spike.

With good waveform data available, the present invention provides methods and systems for finding first arrivals of component signals of interest. However, unlike conventional methods and systems, the methods and systems described herein are capable of consistently detecting first arrivals from waveforms even when a component signal of interest portion is relatively weak as compared with a noise portion of the waveforms. For example, first arrivals from a waveform having a relatively weak signal to noise ratio of less than 13 dB (signal of interest versus noise) can be detected according to the methods and systems described herein. In fact, first arrivals are consistently detected from waveforms having signal-to-noise ratios of 10 dB or less, 5 dB or less, or even 3 dB or less according to principles of the present invention. The methods and systems described herein are similar to methods used by experts looking for first arrivals in a waveform. However, according to the present invention there is no need for an expensive expert. An expert will generally try to locate visually a place where the first arrival should be in order to have a rough estimate of the possible localization of the first break. While the logging operation is going on, he will not try to carefully detect an exact first break position. The expert will observe a zone within which he is confident the first break lies. The method of roughly locating a zone or window within which a first break lies is referred to herein as "localization."

After observing the locality of the first break, the expert will attempt to ascertain an exact position of the first break of a component signal of interest by visually scanning the localization zone. Accurately determining a point defining the exact or nearly exact position of the first break is referred to herein as "detection." After detecting the first break for a single waveform, the expert will usually do the same for all waveforms of an array. He will generally correlate visually across the array to see if he can estimate an approximate slope related to the slowness of the component of interest based on the detection of the first break. During his visual inspection across the array of waveforms, he will look for bad or outlier waveforms and first breaks and quality check or eliminate them. In addition, the expert may check the quality of first motion versus depth, to ensure the quality of the obtained results in second domain (time being the first).

However, according to principles of the present invention, instead of employing an expert, first breaks of component signals of interest are automatically detected in one or an array of waveforms by automatically localizing or finding a zone or window containing the first break, automatically detecting an accurate estimation of the first break location from within the window, automatically checking across the array (if an array rather than a single waveform is being analyzed) for consistency across the array to evaluate slowness of the detected component of interest, and automatically quality checking first arrival transit times. Each of these principles are discussed in detail below. The invention provides good first arrival data automatically.

As mentioned above, the localization of a first break of a component signal of interest comprises selecting a zone or area within which the first break is present. The exact position of the first break is not immediately determined. Instead a zone is defined wherein the first break of the component signal of interest definitely contained. According to principles of the present invention, the zone is calculated using a localization function.

The use of a localization function improves the accuracy of subsequent detection by minimizing the effect of noise and/or other arrivals that are not of interest. For example, a shear wave arrival may be of interest, and localizing the first arrival of the shear wave will eliminate or reduce the possibility of inadvertently detecting a compressional wave arrival. In addition, localizing reduces computation time of the exact location of the first breaks. The detection is focused around the first break of interest, minimizing computation time by eliminating the necessity of scanning an entire waveform. Moreover, logging operations may be done significantly faster than previously possible by localizing. Once a localization zone is computed, for many purposes the logging tool may proceed to another depth without continuing to gather longer waveform segments, because it is known that the waveform received contains the first break of interest. In most logging operations, the speed of the logging operation is limited by the rate information can be telemetered from the tool to the surface. The longer the collected waveforms are, the longer the logging tool must remain in a single location to telemeter the data uphole. However, according to some embodiments, there may not be a localization step and the method may detect first breaks of interest by analyzing an entire waveform. Nevertheless, preferably each waveform in an array is windowed to minimize computation of the exact or nearly exact location of first arrivals of interest.

According to some aspects of the invention, waveforms are localized by a metric function that automatically defines a zone containing the first break. According to some aspects, the function is based on the well known energy ratio computation that is sometimes used to directly detect first arrivals. However, the standard energy ratio is highly susceptible to late energetic arrivals, and commonly results in inaccurate detections. Late energetic arrivals perturb detection of the first break by erroneously detecting the first break late in the waveform. Therefore, according to some aspects of the present invention, the localization function is based on the energy ratio as the kernel of the computation, but is multiplied by a regularization or damping factor to eliminate or minimize the effect of late arrivals. Equation (7) below presents the expression of the localization function used according to one method to define the window.

$$L(u) = \frac{\int_{\tau}^{\tau+2\omega} e^2(u)\,du}{\int_{\tau-2\omega}^{\tau} e^2(u)\,du} \cdot \frac{1}{\beta[1 + \gamma \int_0^{\tau}(e(u) - M_{noise})^2\,du]} \quad (7)$$

with $$\beta = \text{Max}\left[\frac{\int_{\tau}^{\tau+\omega} e^2(u)\,du}{\int_{\tau-\omega}^{\tau} e^2(u)\,du}\right], \quad (8)$$

$$\gamma = c\int_0^N (e(u) - \bar{e})^2\,du, \quad (9)$$

and $$M_{noise} = \frac{1}{T}\int_0^T e(u)\,du. \quad (10)$$

where: e(u) corresponds to the envelope of the signal (Taner, M. T., Koehler, F. and Sheriff, R. E., 1979, Complex seismic trace analysis, Geophysics, 44, 1041-1063).

$\bar{e}$ is the mean of the series, $\tau$ is the point of the time series for which the computation will be done, N is the length of the signal, and $M_{noise}$ is an estimate of the noise variance where T is defined as the first time position where a signal can be observed. In practice, this value T is defined, for a sonic case, as the product of TR-space time of 40 μs/ft. This value T is dependent on the data type (seismic, borehole seismic, etc.). The window value ω is based on the main frequency content of the signal of interest. In the present case, the window size is equal to one and one-half times the period of the signal and is automatically computed based on the type of data and source frequency firing selected by an operator.

Figure 1B:
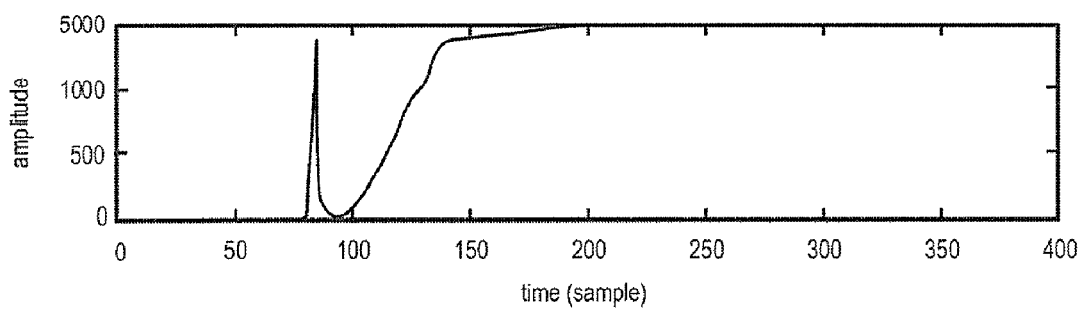
Figure 1C:
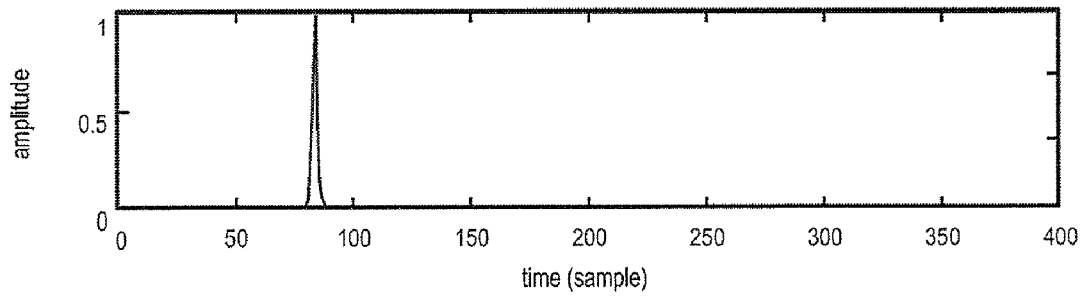

As shown in equation (7), the expression for the energy ratio is quickly recognized, but it is multiplied by a factor in order to handle late arrival signals. Equation (7) represents only one of many factors that may be used according to the principles of the present invention to damp late arrival signals. FIGS. 1A-1C and 2A-2C illustrate a comparison of the application of the energy ratio alone versus the application of the localization function (7) to determine first arrivals. FIG. 1A represents a waveform. FIG. 1B represents the basic energy ratio applied to the waveform of FIG. 1A. FIG. 1C represents the application of the localization function (7) to the waveform of FIG. 1A. As long as there are no late arrival signals, the application of either the basic energy ratio as shown in FIG. 11B or the localization function (7) of the present invention as shown in FIG. 1C exhibit the same result for the first break.

Figure 2A:
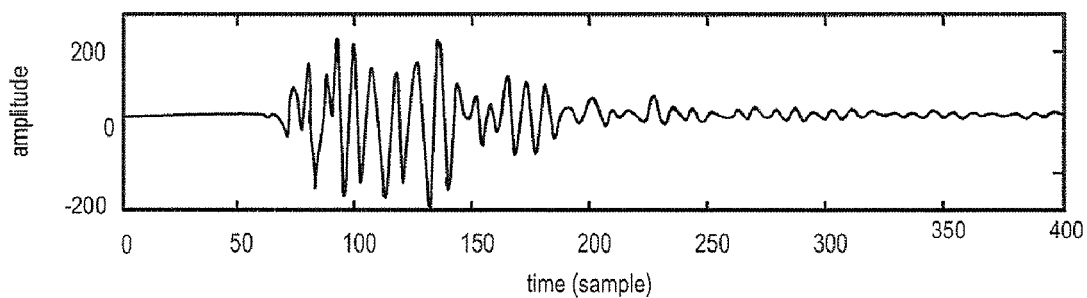
FIGS. 2A-2C illustrate a waveform with a late arrival and a comparison between detecting arrivals by standard energy ratio computations and a localization function of the present invention.
Figure 2B:
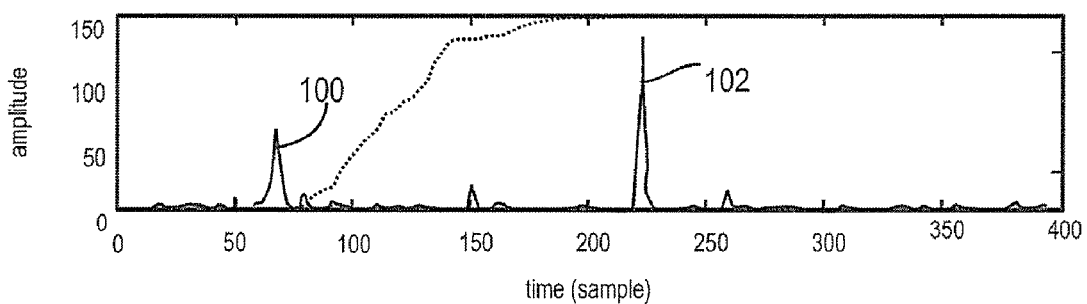

However, if there is a late arrival, the basic energy ratio will yield incorrect first break positions. FIG. 2A illustrates another waveform containing a late arrival. FIG. 2B shows the application of the basic energy ratio to the waveform of FIG. 2A. According to the use of the basic energy ratio, a late arrival (102) dominates and therefore the position of the first break is reported late as compared to its real position at (100). The first arrival (100) will not be detected with the computation of the basic energy ratio.

Figure 2C:
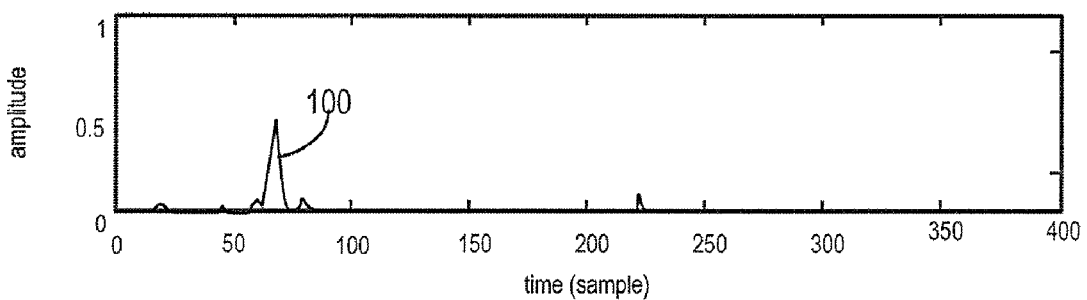

On the other hand, if the localization function (7) is applied to the waveform of FIG. 2A as shown in FIG. 2C, the late arrival (102) is suppressed and the first break (100) is accurately reported. Only the zone of the possible arrival of interest will be defined: 2ω=1 period of the signal $$\text{Zone} \in [T, \max(L(u) + 4\omega] \quad (11)$$

Figure 15:
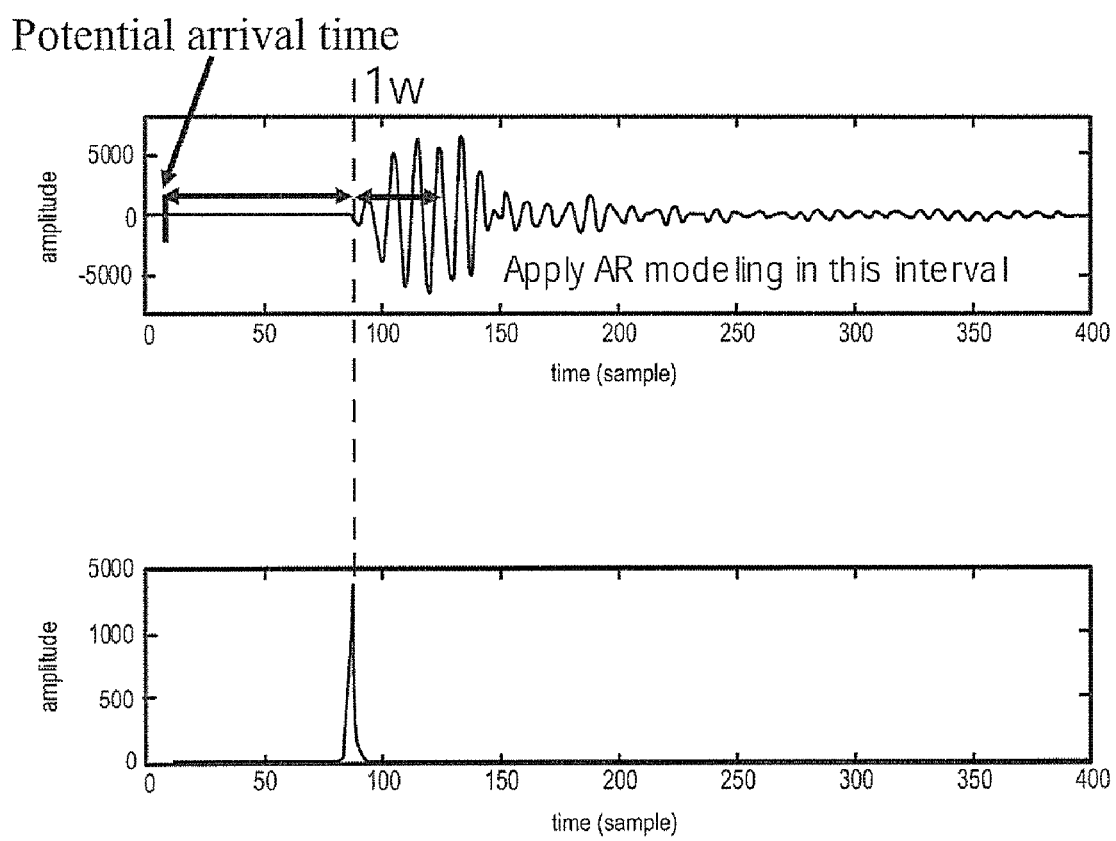
FIG. 15 illustrates an example of the application of a localization function of the present invention to define the window or zone containing the first break.

The shift of the upper limit of the localization zone is related to the fact that the localization function (7) has a tendency to detect the first arrival earlier than the actual first break. Therefore, by slightly shifting the zone, this effect is eliminated and the existence of the first break in the zone of interest is guaranteed. FIG. 15 illustrates an example of the application of the localization function (7) to define the window or zone containing the first break.

Following the application of the localization function (7) to a waveform, a window or zone is defined in which the first break is certain to be found. Accordingly, another component of the methods of the present invention may be applied to accurately detect first breaks within the zone.

According to one aspect of the present invention, the first break location is detected by finding a point within the localization window (if one is defined), before and after which there are two different signals. The point may be found according to some aspects of the invention by a statistical analysis of the waveform. For example, if the component signal of interest is a compressional arrival, there will be noise before the point, and the compressional signal (and noise) after the point. It is possible to generalize this approach and consider that before and after the point of detection, there will be two different stationary time series that will model the signals before and after the first break of interest. Therefore, the methods of detecting a point before and after which are two different signals, is not limited to the detection of compressional components but can be applied to the detection of any signal of interest.

Figure 3:
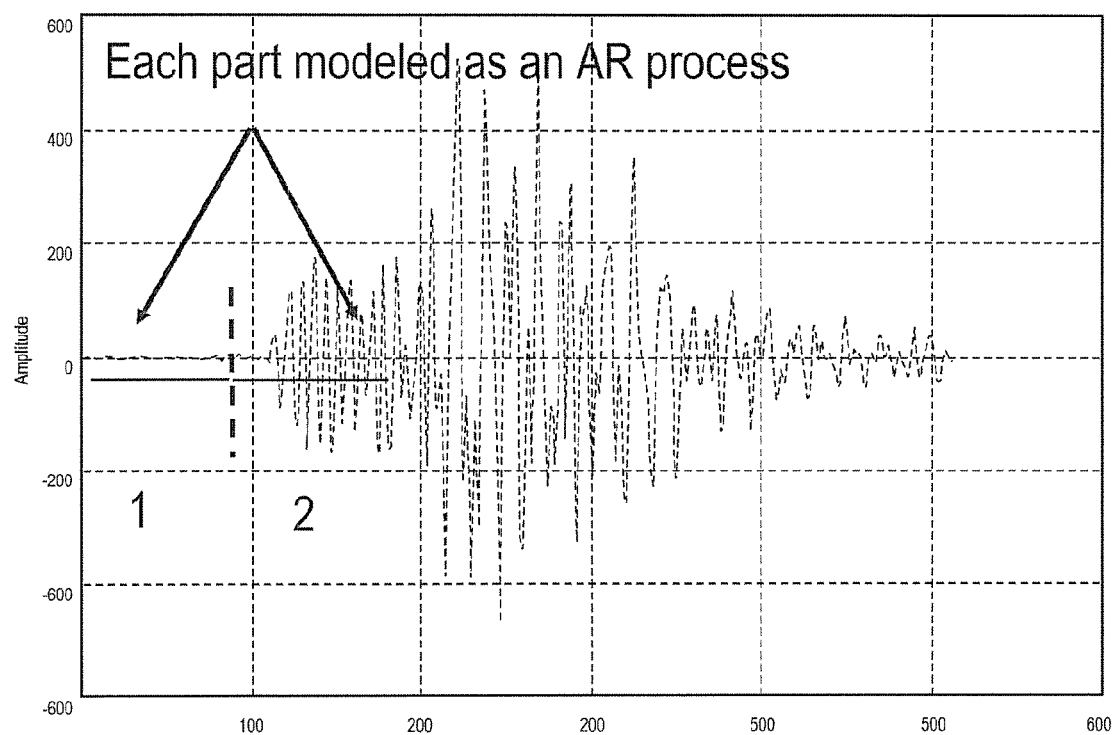
FIG. 3 illustrates an application of a first break detection principle by considering an AR model according to one embodiment of the present invention.

According to one aspect, the time series before and after the detection point is an autoregressive ("AR") model of order M, with coefficients $a_m^i$, (m∈[1, . . . M]. Throughout this disclosure, interval 1 refers to the interval before the point of interest considered as the first break, and interval 2 refers to the interval after the point of interest as shown in FIG. 3. Therefore, the index i will be defined as i∈[1,2]. The time series {$x_n$; n=1, . . . , N} contains the first break of the component signal of interest. This series can be decomposed into two subseries and each is expressed as an autoregressive model:

$$x_n = \sum_{m=1}^{M(1)} a_m^1 x_{n-m} + \varepsilon_n^1, \ (1 \le n \le p_2) \quad (12)$$

$$x_n = \sum_{m=1}^{M(2)} a_m^2 x_{n-m} + \varepsilon_n^2, \ (p_2 \le n \le N) \quad (13)$$

with $n \in [1, \ldots M]$ for the interval 1 and $n \in [N-M-1, \ldots N]$ for the interval 2.

The noise $\varepsilon_n^i$ is assumed to be Gaussian, with mean $E\{\varepsilon_n^i\}=0$, and variance $E\{\varepsilon_n^i\}=\sigma_i^2$ and it is uncorrelated with the deterministic part of the time series, i.e. $E\{\varepsilon_n^i x_{t-m}^i\}=0$.

$p_2$ is defined as the first break of interest, therefore $n_1=1,\ldots,p_2$ and $n_2=p_2+1,\ldots,N$, $n_i$ for the intervals considered as shown in FIG. 3. The two AR models present above Equations (12) and (13)), a background noise model, and a signal model constitute a locally stationary AR model for the estimation of the first break arrival.

If the non deterministic parts are assumed to be Gaussian, the approximate likelihood function l for the two non deterministic time series in the interval $[1,p_2]$ and $[p_2,N]$ is expressed as:

$$l((x; p_2, M(i), a^i, \sigma_i^2(i=1,2)) = \quad (14)$$

$$\prod_{i=1}^{2} \left(\frac{1}{2\pi\sigma_i^2}\right)^{\frac{N_i}{2}} \times \exp\left[-\frac{1}{2\pi\sigma_i^2} \sum_{n=p_i}^{q_i} \left(x_n - \sum_{m=1}^{M(i)} a_m^i x_{n-m}\right)^2\right]$$

where:
$q_0 = M(1)$,
$q_1 = p_2 - 1$,
$q_2 = N$,
$p_1 = M(1) + 1$,
$N_1 = q_i - q_{i-1}$ By denoting $a^i = (a_1^i, \ldots, a_{M(i)}^i)$, the appropriate log likelihood is given by:

$$l((x; p_2, M(i), a^i, \sigma_i^2(i=1,2)) = \quad (15)$$

$$-\frac{1}{2}\sum_{i=1}^{2}\left[N_i \log 2\pi\sigma_i^2 + \frac{1}{\sigma_i^2}\left(x_n - \sum_{m=1}^{M(i)} a_m^i x_{n-m}\right)^2\right]$$

The maximum likelihood estimation of the model parameters is given by:

$$\frac{\partial l((x; p_2, M(i), a^i, \sigma_i^2(i=1,2))}{\partial a^i} = 0 \quad (16)$$

which has the solution $$\sigma_{i,max}^2 = \frac{1}{N_i}\sum_{j=p_i}^{q_i}\left(x_n - \sum_{m=1}^{M(i)} a_m^i x_{n-m}\right)^2 \quad (17)$$

By substituting equation (17) into equation (16), the logarithmic likelihood function for the estimation of $a_m^i$ is reduced to:

$$l(p_2, M(i), a^i, \sigma_i^2(i=1,2)) = -\frac{(N-q_0)}{2}(1+\log 2\pi) - \frac{1}{2}\sum_{i=1}^{2} N_i \log \sigma_i^2 \quad (18)$$

For the present case, it is assumed that the model order for both models, M(i) and $p_1$, are known, however, in practice, they are computed from the received waveform data. In order to compute the model order of an autoregressive model, several statistical methods may be used. For example, according to some embodiments of the present invention an Akaike criterion ("AIC") is employed. The AIC is defined as follows:

$$AIC(p) = -2*\log[\text{maximisedlikelihood}] + 2(p) \quad (19)$$

(maximisedlikelihood=Equation (18)). However, the Akaike criterion may not be optimal for model order selection because of a lack of stability based on noise, and its variance does not tend to go to zero for large sample sizes. Therefore, according to other aspects, another statistical method called the minimum description length ("MDL") is used. The MDL is defined as:

$$MDL(p) = \log[\text{maximisedlikelihood}] + \frac{p}{N}\log N \quad (20)$$

where N is the number of samples considered. The MDL criterion is robust despite noise and provides a better estimate of the model order p in the autoregressive model than the AIC.

Another useful criterion that may be used according to the present invention to compute model order is a Bayesian Information Criterion ("BIC"). The BIC is defined as:

$$BIC(p) = 2*\log[\text{maximisedlikelihood}] - 2(p)\log N \quad (21)$$

where N is the number of samples considered.

After finding the model order and the corresponding AR coefficient, equation (18) becomes a measure for the model fit. The point $p_2$ where the joint likelihood function is maximized, or where AIC, MDL, or BIC is minimized, determines the optimal separation of the two stationary time series. This division point leads to a best fit for both models in the least square sense and is interpreted as a phase onset. Therefore, it is possible to express the log likelihood function as a function of the point of separation between the two time series. AIC criterion leads to the computation of:

$$AIC(p_2) = (N-q_0)(1+\log 2\pi) + \sum_{i=1}^{2} N_i \log[\sigma_i^2] + 2\sum_{i=1}^{2}(M(i)+2) \quad (22)$$

$$AIC(p_2) = \sum_{i=1}^{2} N_i \log[\sigma_i^2] + 2\sum_{i=1}^{2}(M(i)+2) + C \quad (23)$$

with the first break corresponding to the minimum of this function, i.e. $\text{First}_{break} = \min[AIC(p_2)]$.

Using the MDL criterion to detect the first break, the computation leads to:

$$MDL(p_2) = \frac{(N-q_0)}{2}(1+\log 2\pi) - \frac{1}{2}\sum_{i=1}^{2} N_i \log[\sigma_i^2] + \frac{\log N}{N}\sum_{i=1}^{2}(M(i)+2) \quad (24)$$

$$MDL(p_2) = -\frac{1}{2}\sum_{i=1}^{2} N_i \log[\sigma_i^2] + \frac{\log N}{N}\sum_{i=1}^{2}(M(i)+2) - \frac{C}{2} \quad (25)$$

In the same case, the first break will be given by the minimum of the MDL function, i.e. $\text{First}_{break}=\min[MDL(p_2)]$.

Figure 4:
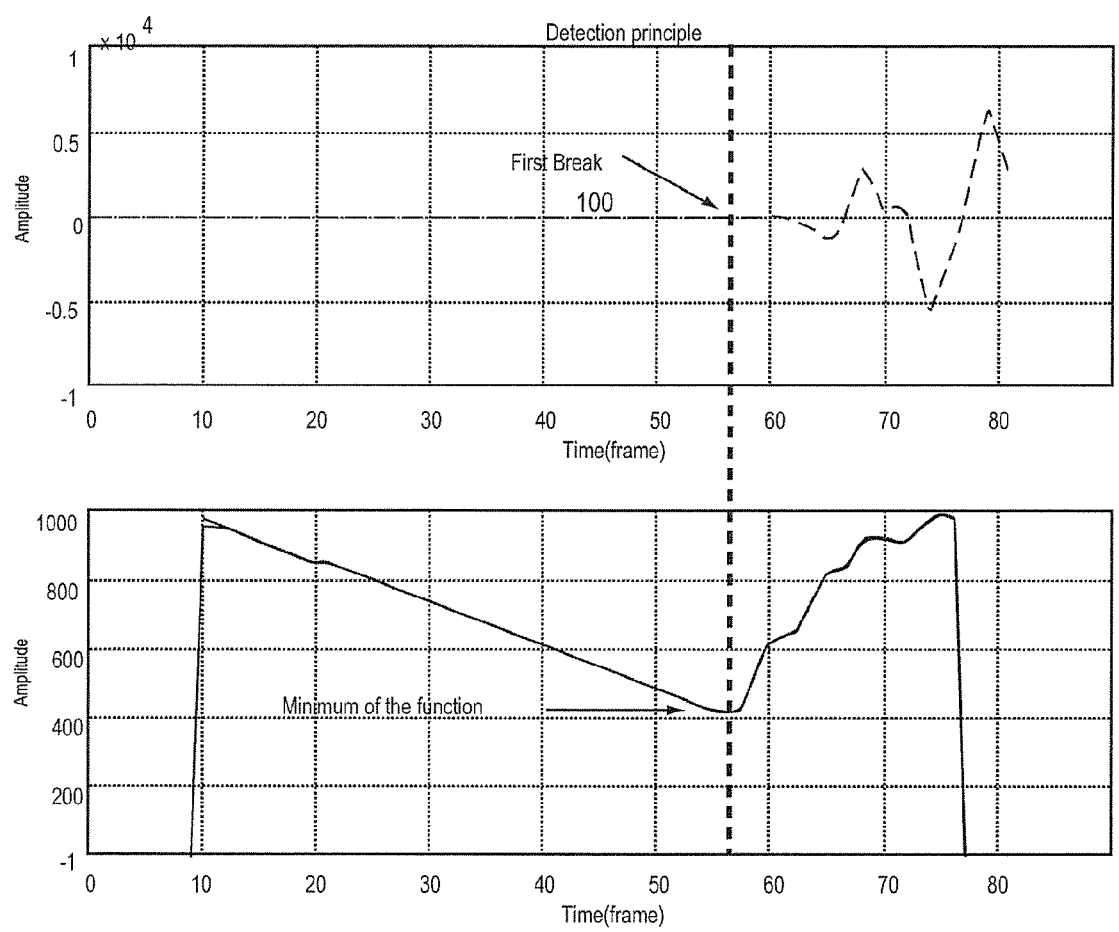
FIG. 4 illustrates detecting a first break in a waveform by calculating a minimum of a statistical function according to one embodiment of the present invention.

Similarly, if the BIC is used, the same logic is applied and therefore the first break will be given by the minimum of the function:

$$BIC(p_2) = (N - q_0)(1+\log 2\pi) + \sum_{i=1}^{2} N_i \log[\sigma_i^2] + \log N \sum_{i=1}^{2}(M(i)+2) \quad (26)$$

$$BIC(p_2) = \sum_{i=1}^{2} N_i \log[\sigma_i^2] + \log N \sum_{i=1}^{2}(M(i)+2) + C \quad (27)$$

i.e. $\text{First}_{break}=\min[BIC(p_2)]$. FIG. 4 illustrates the detection of the first break (100) finding a minimum of a statistical function such as those described above.

Figure 5:
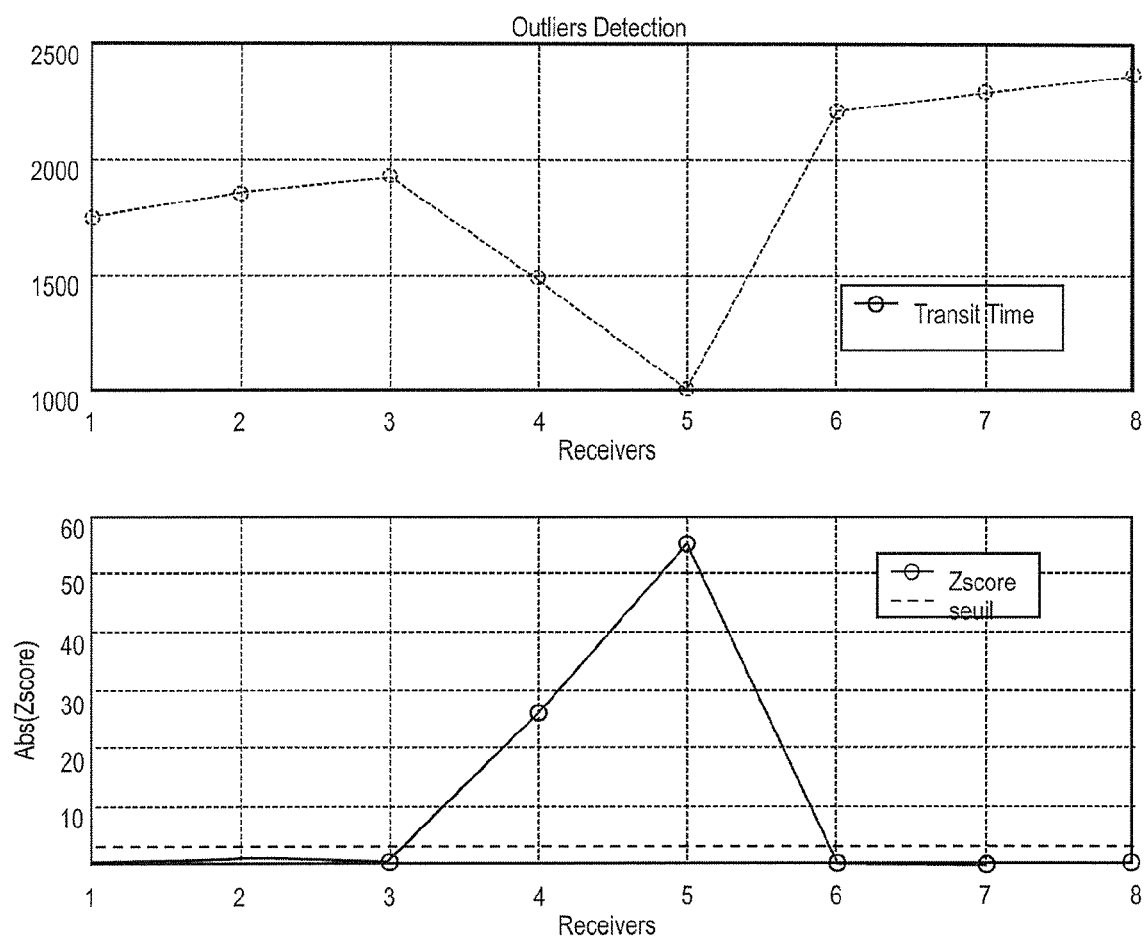
FIG. 5 illustrates detection of outliers in a data set of first arrival times according to one embodiment of the present invention.

Following detection of the first breaks for the different waveforms, the quality of the results may be automatically evaluated according to principles of the present invention. In other words, the quality of the detection is checked as is the consistency of the results obtained for different waveforms of an array. As used herein, an invalid or outlier detection is defined as a detection that is not consistent with the general trend of the computed results. FIG. 5 illustrates an example of some invalid or outlier data and a statistical Zscore for each detection. As shown in the FIG. 5, detections at receivers (4) and (5) do not follow the general trend, demonstrating incorrectly or badly detected points. Identifying bad detections may be accomplished by any of several methods described herein or others to eliminate outliers. A problem, however, with eliminating outliers is that sensitivity to outliers is strongly dependent on the method used to detect them, and therefore the method used to find the outliers may change the obtained results.

The most common methods used to detect outliers are based on the computation of a standard deviation of a data set. Outliers are often estimated as any point outside a certain number of standard deviations. Another approach includes computing studentized deviations defined as:

$$z_i = \frac{x_i - \mu}{\sigma}$$

where: x is a testing point;
$\mu$ is the mean of the time series; and
$\sigma$ is the standard deviation of the time series The studentized deviations method, however, generally fails in the presence of multiple outliers.

In fact methods of detecting outliers based on standard deviation have other disadvantages as well. The mean $\mu$ moves toward the outlier, the standard deviation $\sigma$ is inflated, and the normalized deviations $z_i$ are often not large enough to indicate the presence of outliers. These problems are generic to least squares estimators, a class that includes $\mu$, $\sigma$, regression models, and much more. Therefore, one way to address the problems above is to replace the mean $\mu$ with an alternative location estimator that is less sensitive to outliers and the standard deviation $\sigma$ with an alternative scale estimator that is less sensitive to the outliers.

Therefore, in order to provide a more robust technique of detecting outliers, according to some aspects of the present invention, a Hampel Identifier test may be used. An application of the Hampel test is discussed below.

Considering a series of peaks detected by $P=\{p_k\}$ and a median of this series, $p^{104}$, defined as:

$$p^{\psi}=\text{median}\{p_k\} \quad (28)$$

the MAD (median absolute deviation) scale estimator is computed as:

$$P_{MAD}=1.4826\,\text{median}\{|p_k-p^{\psi}|\} \quad (29)$$

The value of median $\{|p_k-p^{\psi}|\}$ is a measure of how far the data point $p_k$ typically lies from the reference value $p^{\psi}$. The normalization factor 1.4826 comes from the fact that the nominal part of the data sequence $\{p_k\}$ has a Gaussian distribution. $P_{MAD}$ is an unbiased estimator of the standard deviation $\sigma$ when normalized this way. Therefore, according to some aspects of the present invention studentized deviations are calculated as follows:

$$z_k = \frac{p_k - p^{\psi}}{P_{MAD}} \quad (30)$$

A point $p_k$ is considered suspicious or an "outlier" if $|z_k|>3$ according to some embodiments, or if $|z_k|>2$ according to others. The procedure described above for identifying outliers is robust and much more effective than the traditional methods based on standard deviation. The procedure described above is also advantageously simple to compute and therefore it is fast and can be easily implemented at a well site with minimal computational resources.

Considering certain data sets, standard procedures for detecting outliers do not correctly extract the two or more outliers. Only the outlier with the highest bias is likely to be detected. On the other hand, using the procedure described above according to principles of the present invention, multiple outliers are detected and eliminated.

Figure 6:
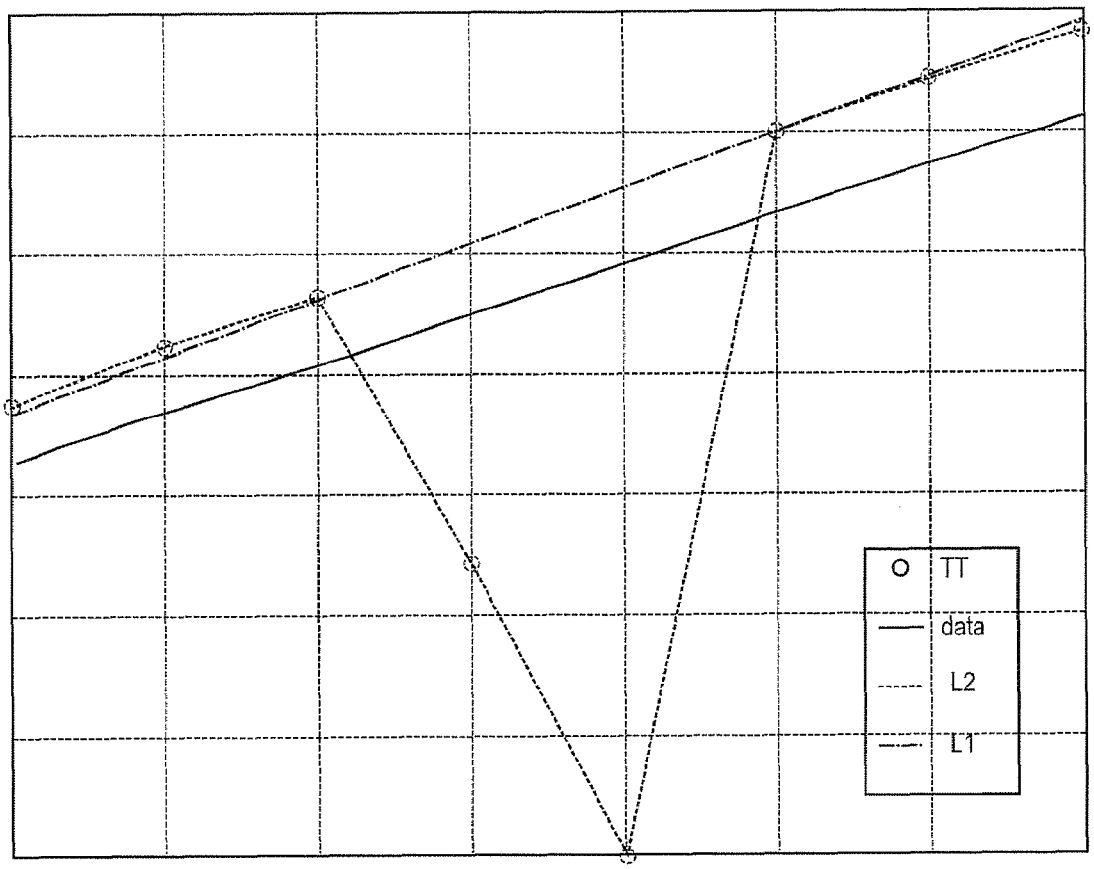
FIG. 6 is a slowness estimate chart illustrating an L1 fit based on the first arrival data according to one embodiment of the present invention.

In a logging operation, a user may want to estimate formation slowness based on the detection of first arrivals before or after outliers are extracted. In order to estimate slowness, a straight line is fitted to the first arrival data using an L1 norm. The L1 fit is described below. FIG. 6 illustrates different slowness estimates depending on the type of norm used to fit the straight line. As shown in FIG. 6, an L2 norm is sensitive to possible outliers and therefore not as accurate as the L1 norm. A slowness log based on the first arrivals may be a good way to characterize zones of a formation into, for example, one of five general categories and thus provide feedback to a logging system to automatically change parameters for a DSTC or other computation.

One method of providing the L1 fit shown in FIG. 6 is described below. The equation for a straight line is expressed as:

$$y(x)=a+bx \quad (31)$$

to find the coefficient of the line defined by equation (31), a minimum is found according to:

$$\sum_{i=1}^{N} |y_i - a - bx_i| \min \qquad (32)$$

The solution is therefore:

$$a = \text{median}\{y_i - bx_i\} \qquad (33)$$

$$\sum_{i=1}^{N} x_i - \text{sgn}(y_i - a - b) = 0 \qquad (34)$$

According to this simple fit, an estimate of the formation slowness based on the first motion detection is provided. As mentioned above, such information may be useful in and of itself and/or for semblance processing at a well site wherein the parameters of the processing are dependant on the formation slowness considered. The slowness estimate based on the first motion detection may then be used to characterize slowness for the formation into, for example, one of five general slowness categories. The slowness characterization may then be taken into account during semblance processing.

For example, using an MSIP tool available from Schlumberger to log a formation, typically there is a long data array and it is possible that the tool will traverse a layered medium. Accordingly, there is not just one slowness value available from the first arrival data, but possibly two, three, or more. Therefore, according to principles of the present invention, two or more slopes may be fit to the first arrival data to identify and characterize slowness variations in the formation in a high resolution log.

Considering a tool with M receivers in an array, the resolution of a desired log is limited by the size of the array used to record data. Therefore, the resolution of a slowness log is limited by the number l of receivers used to record the data. Due to overlapping of the tool while logging, the maximum number of subarrays that will see the same segment of the formation is defined as:

$$N = M - l + 1 \qquad (35)$$

Figure 16:
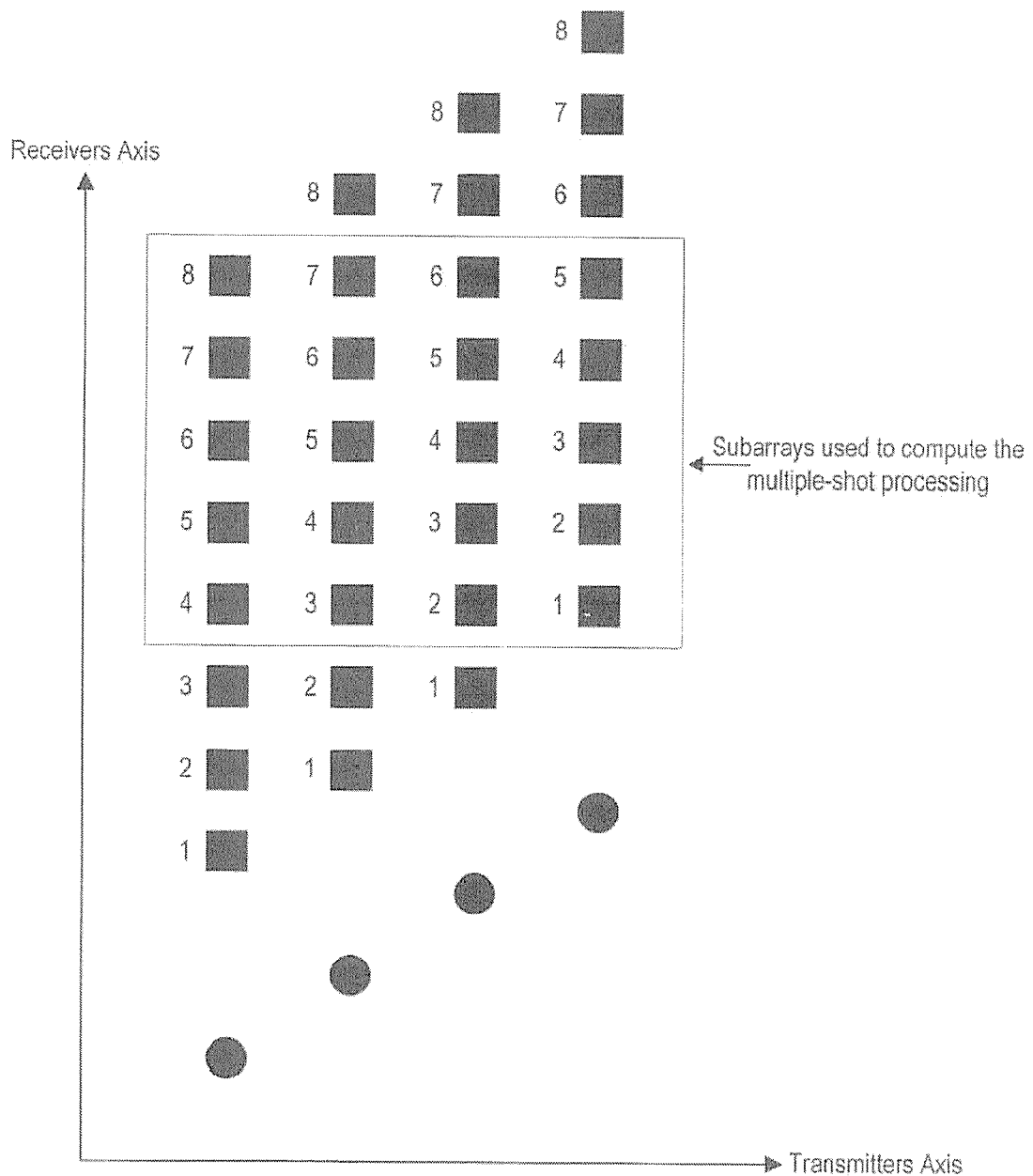
FIG. 16 illustrates the redundancy of information useful for a high resolution log.

Accordingly, depending on the resolution a user expects, the redundancy of the data will be used to provide high resolution slowness estimates. In the case of a modern sonic tool, an array may contain eight receivers at a spacing of 0.5 ft. If a user desires a log with a resolution of 1 ft., five receivers, he will use the N=4 slowness value to compute a final high resolution log. FIG. 16 illustrates the redundancy of information. Prior art methodology of producing high resolution logs simply takes an average of the different slowness values in order to provide the final high resolution log. However, according to principles of the present invention for detecting first arrivals, the high redundancy data processed in a more sophisticated manner.

Using the robust fit (L1) with the different combinations of available data, computing slownesses for the different combinations of the subarray provides enough information to obtain an accurate fit. In order to detect potential outliers (i.e. wrong detections providing wrong slowness estimates), a Zscore is calculated for the data in order to flag any bad or incorrect points. Because the L1 fit is not very sensitive to outliers, the detection of outliers is used as an indication to the user. No reprocessing is done at this stage.

Figure 7:
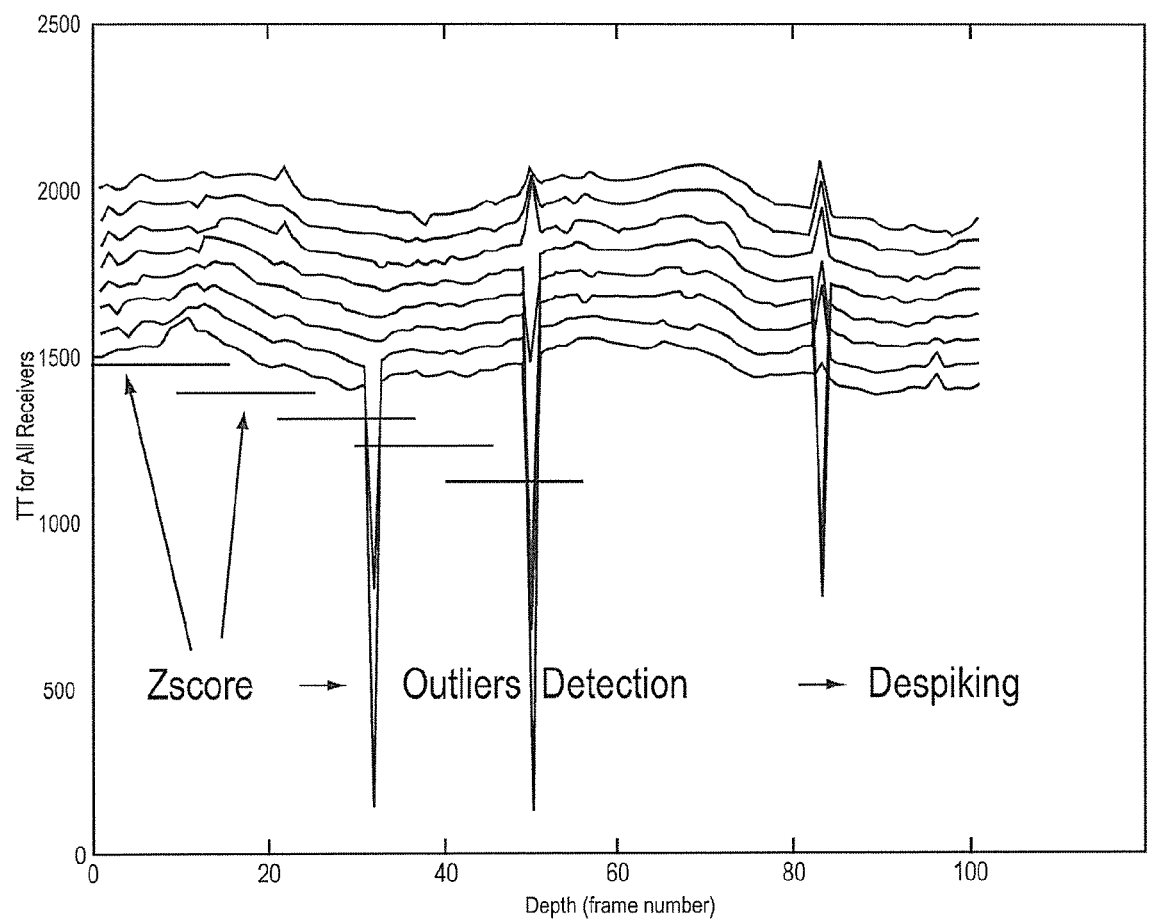
FIG. 7 illustrates a despiking method in a depth domain according to one embodiment of the present invention.

However, according to some aspects of the present invention, after detecting first breaks and finding outliers, a redetection procedure may be applied to the waveforms with the outliers. Nevertheless, according to some aspects of the invention, the redetection procedure is different from the initial first arrival detection methods. Considering that an operator may have an estimate of the slowness of a formation illustrated by the L1 fit described above, a receiver with incorrect first arrival detection should have its first break recorded near the L1 line (FIG. 7). Ideally, the first break of the receiver should be on the L1 line, and therefore detection is accelerated according embodiments of the present invention by reducing the zone of investigation to the proximity of the L1 line. In order to do so, the zone of investigation is defined by the interval:

$$\left[ \frac{Tr_i - b}{a} - 2\omega, \frac{Tr_i - b}{a} + 2\omega \right].$$

where: $Tr_i$ is the Tr-spacing corresponding to the receivers,
 i, a and b are parameters of line fit, and
 $\omega$ is the window size considered defining the zone of investigation.

Figure 10:
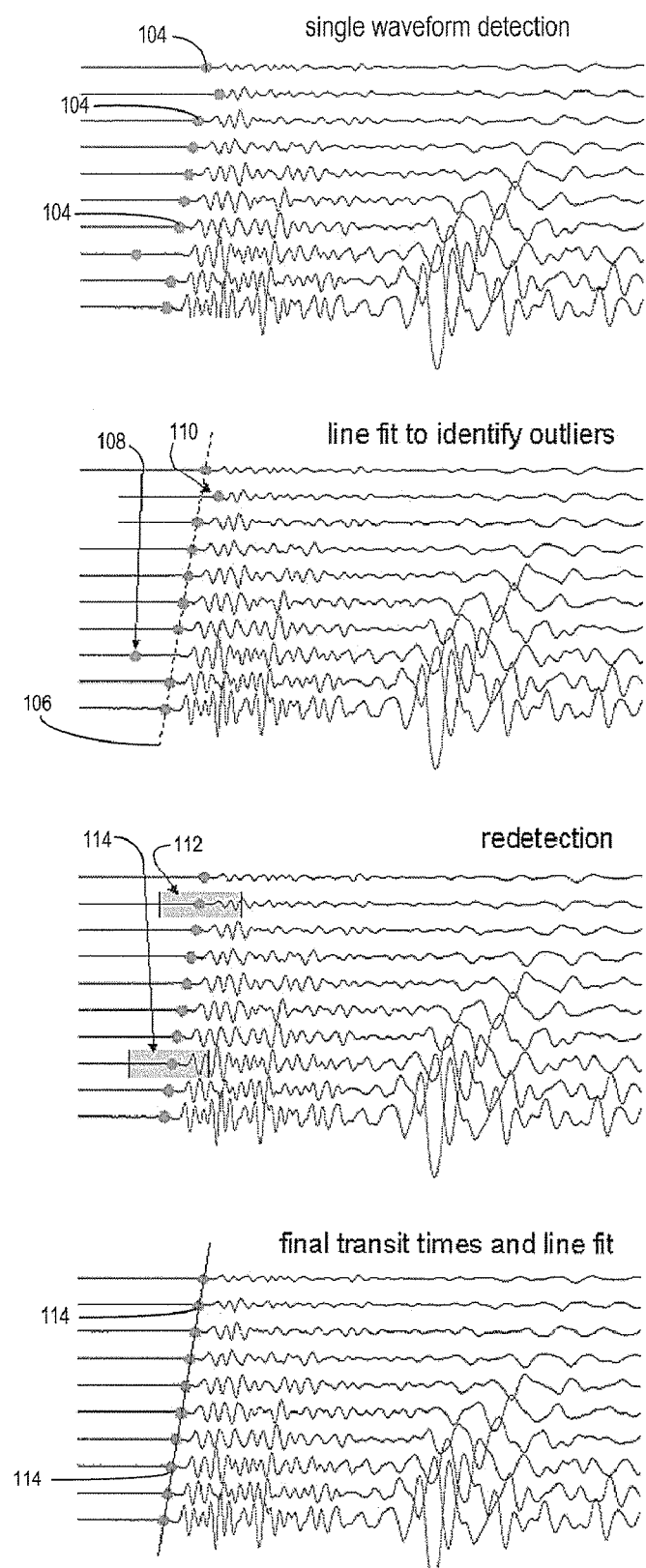
FIG. 10 illustrates detection and correction of first arrival data outliers according to one embodiment of the present invention.

FIG. 10 illustrates an application of the outlier detection and redetection principles described above. As shown in FIG. 10, first arrivals (104) are detected for individual waveforms. A line fit (106) is applied to the first arrivals (104) to identify outliers (108, 110). First and second redetection zones (112, 114) are considered at two window sizes before and two window sizes after the line (106) representing the ideal location of the first arrivals. With the redetection zones (112, 114) defined, the same or a similar procedure applied previously is repeated—the localization step followed by the detection step and the quality control check. According to FIG. 10, following redetection, first arrivals (116, 118) are redetected and are no longer outliers. If, however, even after redetection the first arrivals (116, 118) continue to be outliers, the detection of the outliers is flagged as a bad detection and eliminated. According to some embodiments, only one redetection is performed for each outlier. However, two or more redetection procedures may be applied according to other embodiments.

It may be desirable, even after detecting first breaks and eliminating outliers in the time domain, to further refine first arrival data by analyzing and despiking first arrival data in another domain. For example, according to the some aspects of the invention, information about a Z-axis (depth) may be considered as well. It is possible that some bad first arrival detection may be recorded even after applying an outlier detection method such as the one described above. For example, there may be instances wherein the first arrival detections from all receivers are bad at a certain depth. Moreover, there may be several bad detections at a certain depth and only a couple of good detections, resulting in the good detections being identified as bad. Therefore, according to some aspects of the present invention a method of checking for spikes or outliers along a borehole depth is applied.

One embodiment is described below for detecting outliers in an additional domain. $Rt_i(z)$ is defined as the first break of receiver i, at depth, z. Consistency of detection for one receiver is tested at multiple depths. For example, first arrival data for a receiver at depths of z−1, z, and z+1 may be analyzed. Of course any number of comparisons may be made according to principles of the present invention. If in the interval [z−1, z, and z+1] a bad first break detection is present, the bad first break along the depth will show an unrealistic variation compared to the others. Therefore, an interval is defined in which the consistency of the first break detection versus depth may be evaluated.

According to one embodiment, a sliding window of size L is used to evaluate whether or not a first break detected is consistent versus depth. According to some embodiments, the window L is equal to approximately one array length. Within the window L is a series including the first break $PRt_i=\{Rt_i(z_k)\}_{k\in[1,L]}$. The goal is once again to detect and filter possible outliers. Therefore, according to some embodiments the same statistical test described above is applied on first break detections versus depth. That is, a Zscore is calculated for all the data and the Zscore for each first break detected within the sliding window is measured against a threshold. This method of checking for consistency versus depth may be applied to each sensor, and possible problematic detections are flagged and redetected, preferably only once. A flagged bad detection is then corrected by interpolating between reliable data points. Each corrected first break detection may be visually flagged to inform an operator that the detection presented was not an actual detection, but instead a corrected one.

Figure 8:
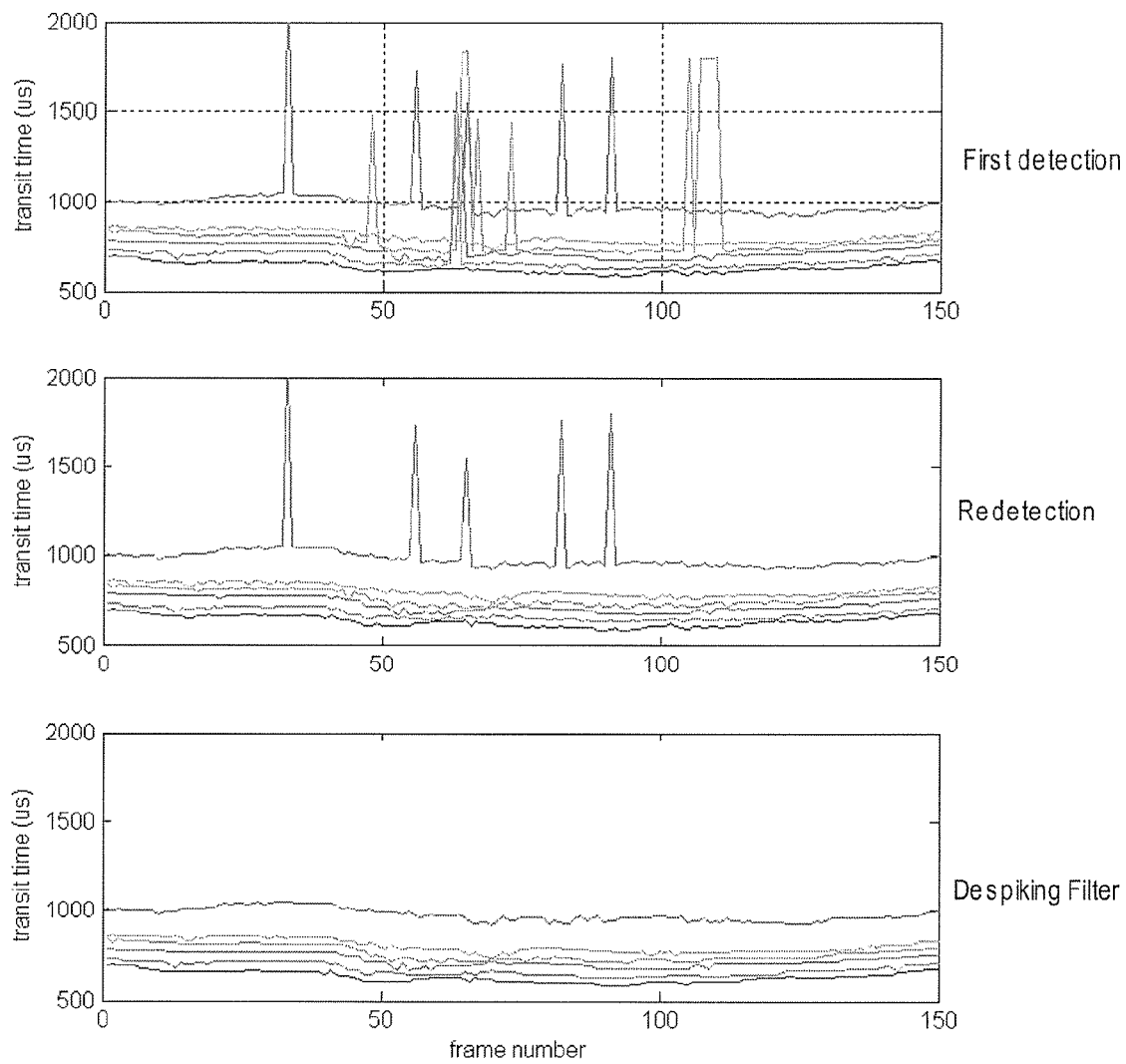
FIG. 8 illustrates a redetection step in the despiking method shown in FIG. 7 according to one embodiment of the present invention.

FIG. 8 illustrates the principle of despiking in an additional domain. According to FIG. 8, first motion detection data is shown versus depth and includes multiple spikes (120). Each of the multiple spikes (120) is flagged and first motion is redetected at the problematic spiking areas. Following redetection, there may continue to be several redetected spikes (122) as shown. The remaining redetected spikes (122) are therefore eliminated and corrected (e.g. by interpolation) by the despiking filter as described above.

Figure 9:
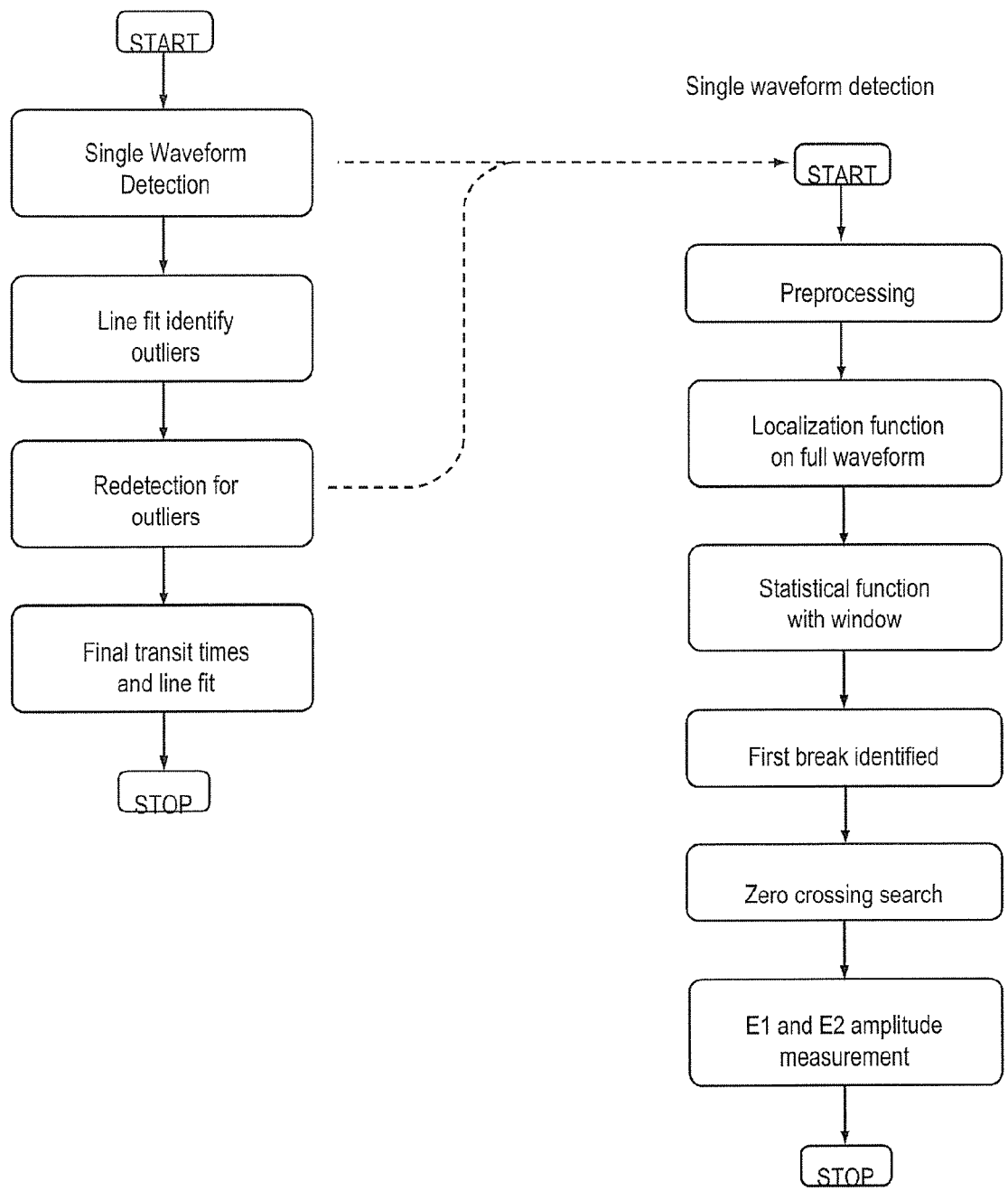
FIG. 9 is a flow chart illustrating steps for providing good first arrival data according to one embodiment of the present invention.
Figure 11:
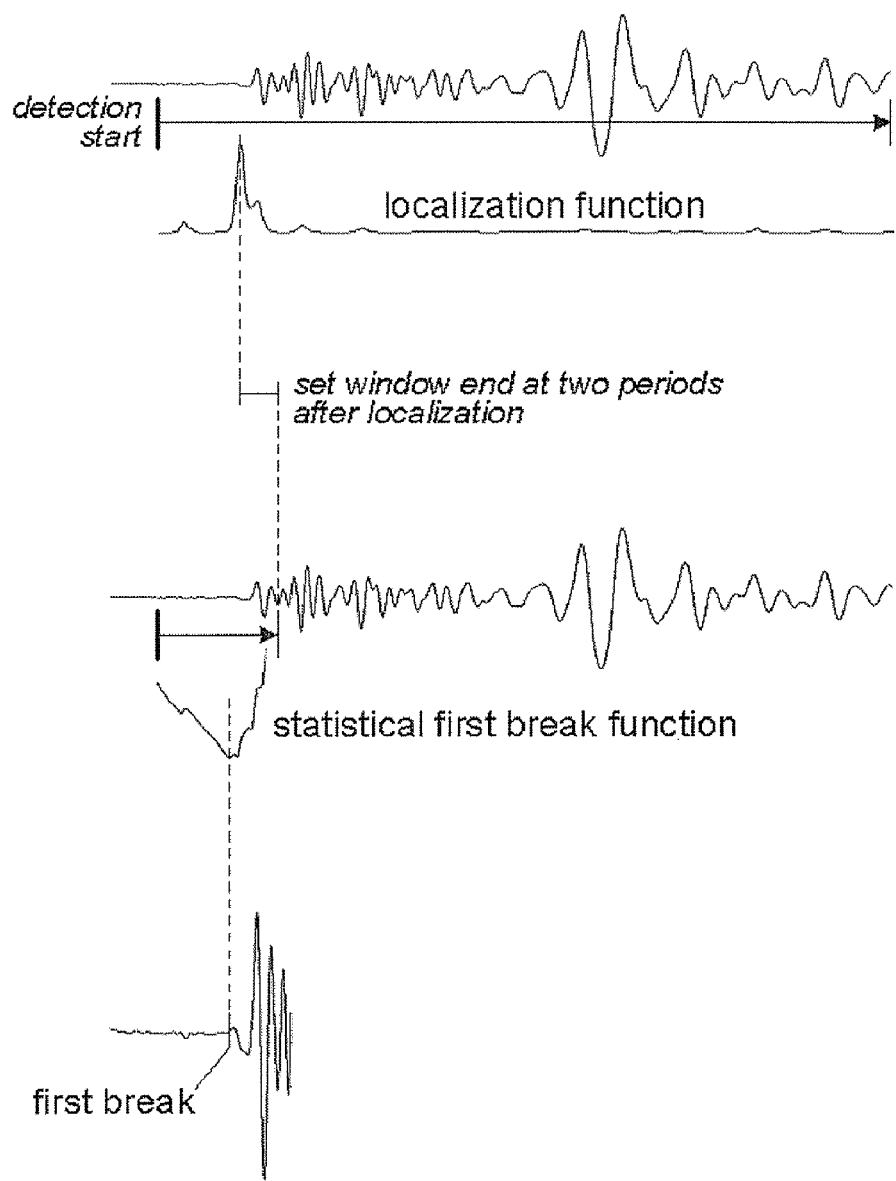
FIG. 11 illustrates localizing a statistical function to a search zone to find an exact or nearly exact location of a first break according to one embodiment of the present invention.
Figure 11:
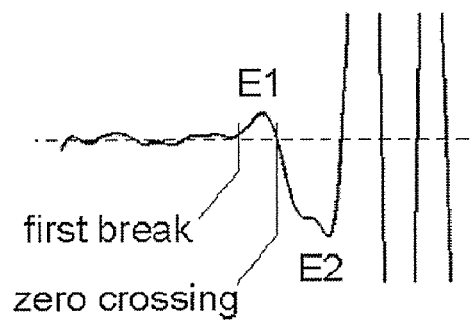

Several aspects to the methods and systems for logging have been described above, including specific examples. One example of a general framework for the methods described herein is illustrated by a flowchart in FIG. 9. FIG. 9 represents several steps that may be applied to waveform data in order consistently detect first motion of component signals of interest, even from waveform data having SNR's of 10 dB or less, 5 dB or less, or 3 dB or less (signal of interest versus noise). Application of the different steps described in the flow chart is illustrated in FIGS. 10-11. FIG. 10 is referenced above and illustrates detection of first breaks for multiple waveforms, identifying outliers, redetecting, and finding final transit times. FIG. 11 illustrates localizing a waveform to define a search zone in which the first break is contained, and applying a statistical function to the search zone to find an exact or nearly exact location of the first break—including how the methods described herein ensure detection of the correct first break (in the present case E1 rather than E2).

Figures 12A, 12B:
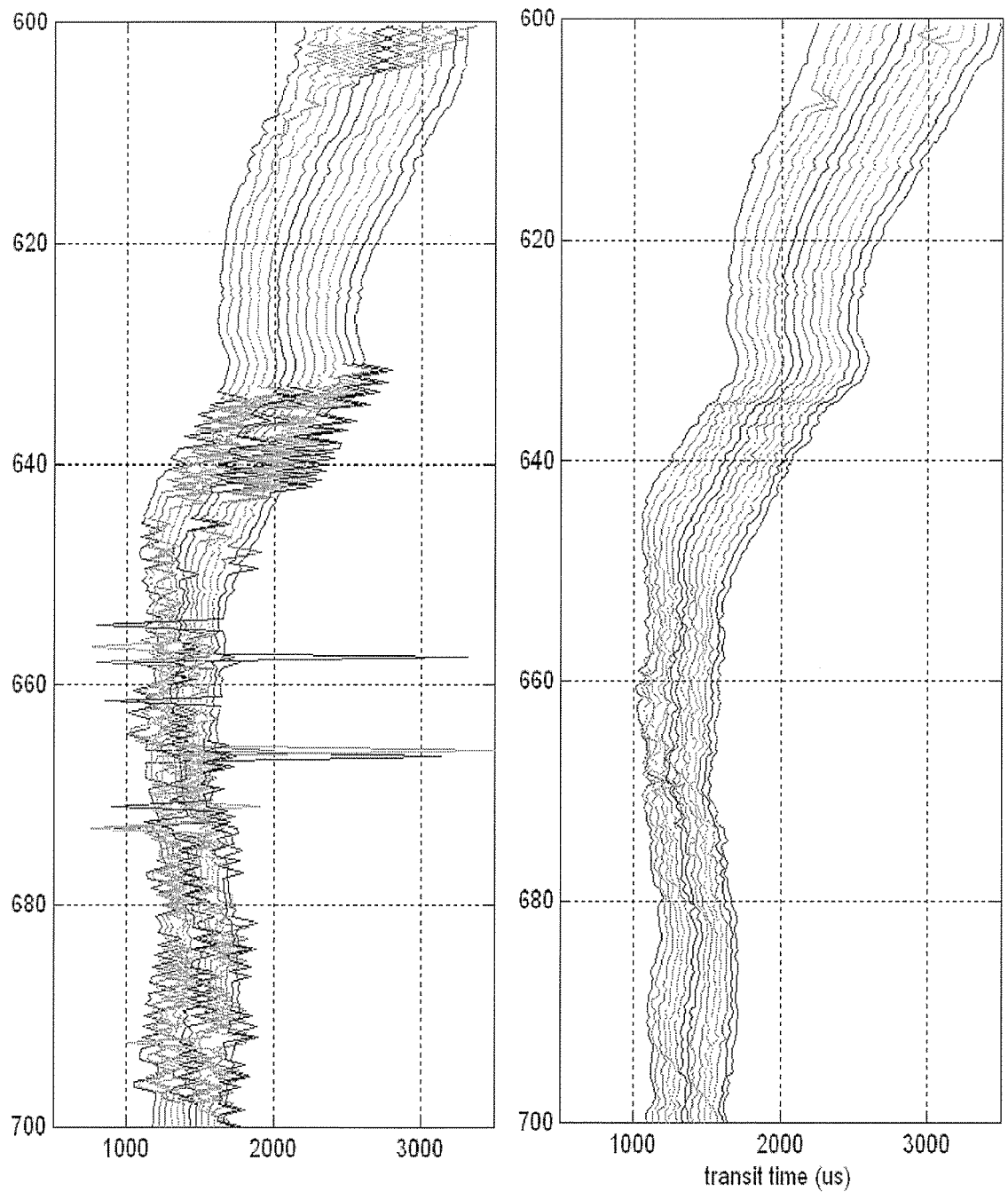
FIG. 12A-12B illustrates the improvement available for first break data over the prior art by applying principles of the present invention.

FIG. 12A-12B illustrates the improvement available for first break data over the prior art by the application of methods described above. FIG. 12A illustrates first motion detection data based on actual waveform data using prior art methods without any user intervention or setting of parameters. As shown, detection of first arrivals is inconsistent using prior methods. The prior methods simply cannot consistently detect first arrivals without expert-tuning during the logging operation when measurements comprise a SNR of the component signal of interest portion versus the noise portion of less than 13 dB. However, using the methods described above according to principles of the present invention, the first arrivals are consistently detected as shown in FIG. 12B, even for component signals of interest that are relatively weak compared with noise.

Figure 13:
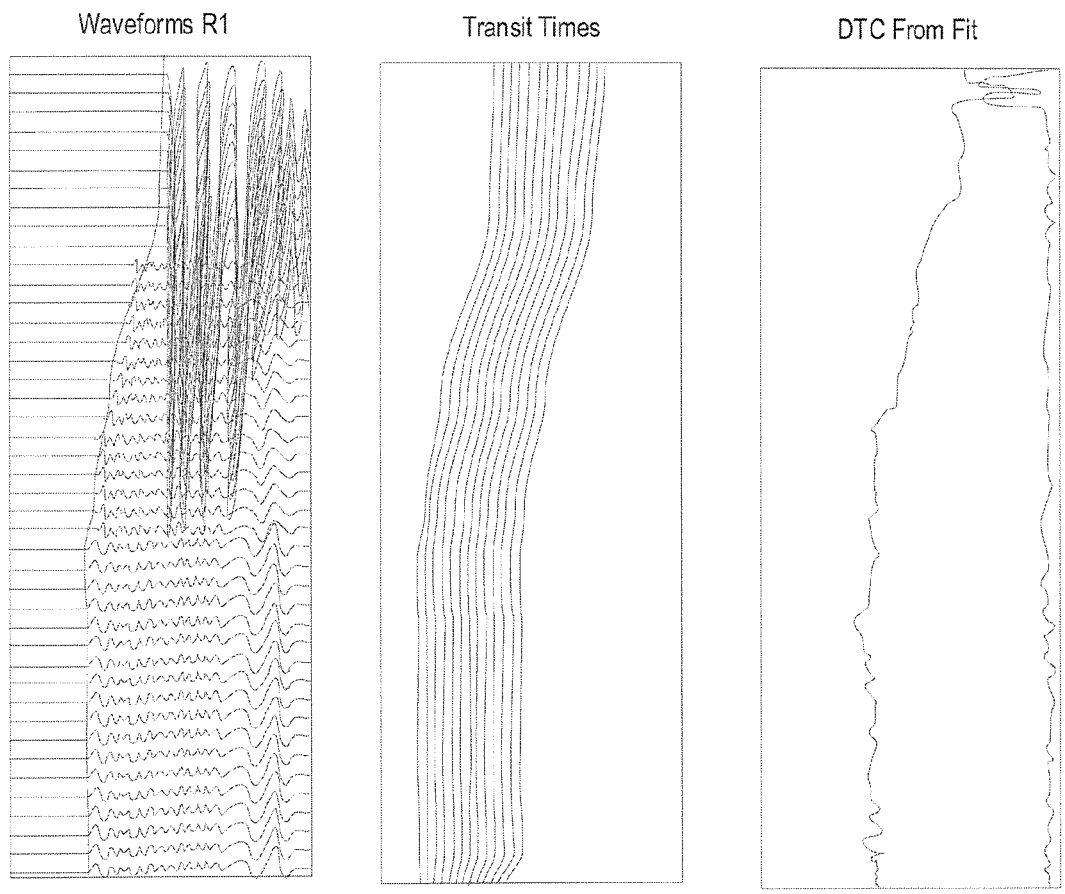
FIG. 13 illustrates a field test applying the methods of the present invention.

Similarly, FIG. 13 illustrates a field test applying the methods described here. Raw data (waveforms) are shown at the left. Following the methods described above to detect first breaks results in the good data shown just to the right of the waveforms. Slowness estimates may then be made based on the first arrival data, as shown just to the right of the transit time data. The slowness estimate illustrates the L1 fit described above, and the slowness chart also illustrates an error function (E).

As mentioned above, according to some aspects of the present invention, the methods and systems described herein provide robust, accurate, usable first motion data without any input parameters or user intervention, with a relatively simple process that requires very little computer resources. The methods and systems described herein offer tremendous advantages over prior methods that require significant user intervention in order to properly set and change input parameters in order to obtain good first motion detection data.

Up to this point in the disclosure, the focus of has been primarily on the first arrival detection without much consideration of other components present in a Waveform (other than noise). That is, there has been no assumption as to the type of waveforms that are considered. There are several ways, however, that the principles of the present invention may be applied to detect the first arrivals of other components present in a waveform. Some of the different options are presented below.

One of the methods described herein includes using the localization function to find a first break of another component. One way to find a first arrival of another component signal of interest is to restart the method used to find the initial first arrival beginning with the initial first arrival signal and assuming no signal of interest before the initial first arrival location. Applying the same procedures described above yields first motion detection for a second component arriving after the initial first arrival. Other component signals may also be found by continuing this process along the full length of the waveform. Repeating the methods for finding the initial first arrival to find arrivals for additional component signals offers the advantage of the low computer processor requirements.

However, another method of finding first breaks of other component signals of interest uses a different strategy. Following detection of the initial first arrival, slowness of the initial component is known via the L1 fit. Therefore, according to one embodiment detection of other first arrivals comprises correcting the waveforms move out from the slowness of the component detected by the initial first break. This operation aligns the component of the initial signal having the same slowness as the one used to correct the data from the move out. Following realignment, the reference trace is computed as described above in equation (1). However, now the reference trace is computed in the time domain. After calculating the reference trace, it is removed from each different trace corrected from the move out as explained above. Subtracting the reference trace will set to zero the portion of the waveform that is related to the initial component detected. Therefore, all the signals before the second component of interest are removed by this simple transformation. Accordingly, the first break detection algorithm may be reapplied to find the first arrival of the second component of interest. Likewise, for a third component, the operation just described is repeated, i.e., correct the move out of the data from the slowness calculation of the previous component of interest, compute the reference trace, remove the reference trace from the waveform data, and reapply the first motion detection method. It is worthy of note that the data is corrected from geometrical spreading prior to application of the reference trace. The detection of different components is done after correcting the data from the move out due to the previous component. Therefore, the first break is corrected in order to obtain its absolute value and not the relative one.

Figure 14:
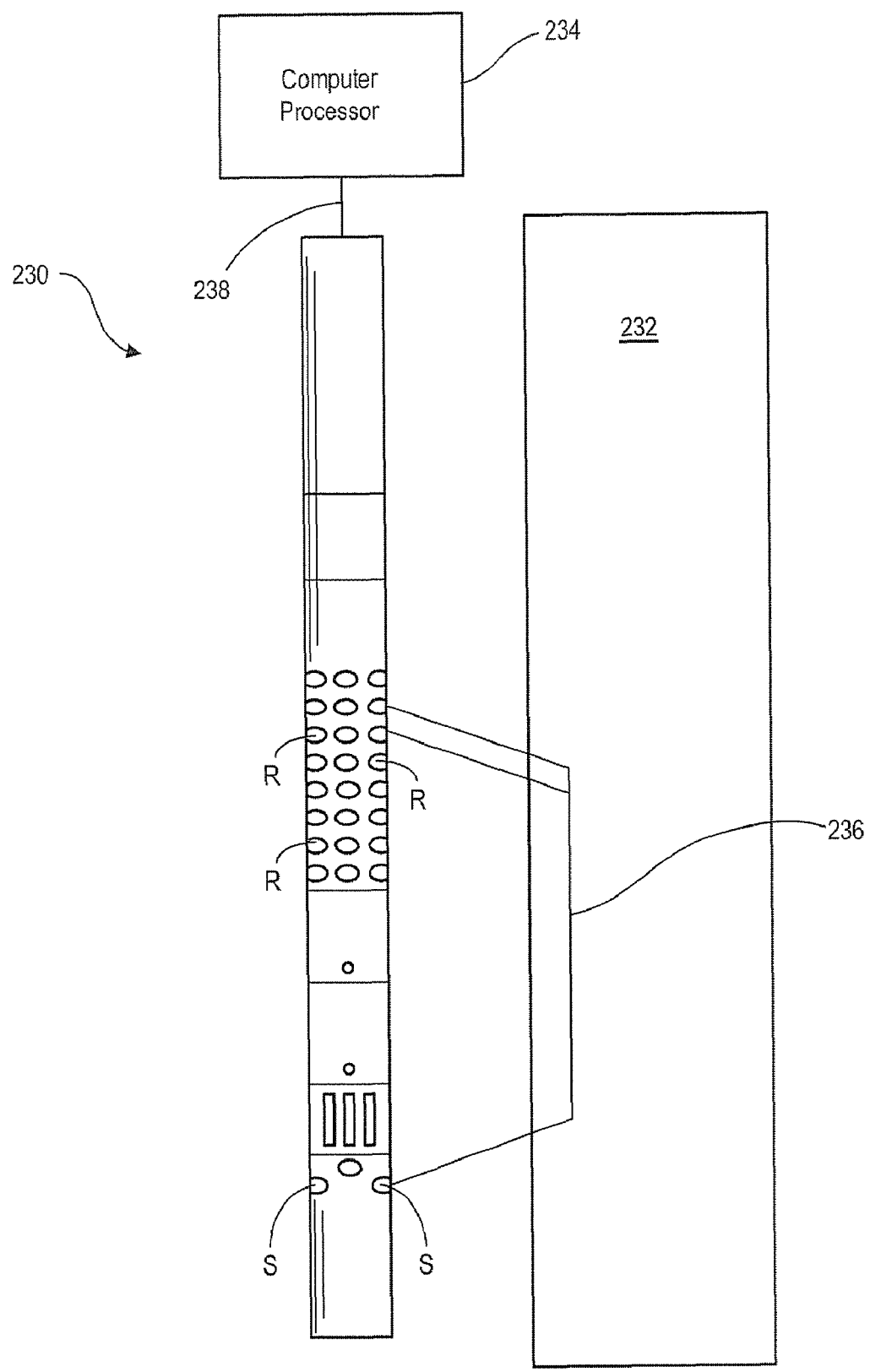
FIG. 14 is side view of a logging tool and its associated surface equipment according to one embodiment of the present invention.

The methods of the present invention described above may be used with logging tools and systems of any type. Systems according to the present invention are capable of consistently detecting first motion of component signals of interest even when the component signal of interest is relatively weak as compared to the noise (e.g. SNR of 10 dB or less). For example, referring to FIG. 14, a sonic tool (230) is shown adjacent to a formation (232). The sonic tool (230) includes a source (S), and at least one sensor or receiver (R). In the present embodiment there are multiple receivers (R) and sources (S). The source (S)/receiver (R) arrangement shown is exemplary in nature and there may be any arrangement of receivers and/or sources. The receivers (R) and sources (S) are coupled to a computer processor (234) for collecting and processing data from the sonic tool (230). Also shown is a wave ray path (236) representing a path for a compressional wave caused by activation of the source (S). The receivers (R) may be of different types, including, but not limited to, piezoelectric and magneto-restrictive receivers. The receivers (R) are able to detect the arrival of sonic waves.

Measurements collected from the sonic tool (230), which may include waveforms generated by the receivers (R) over time, is sent to the computer processor (234) via a cable (238) from which the sonic tool (100) is suspended or by any other convenient communication technique (e.g. mud telemetry). The computer processor (234) is commercially available from a wide variety of sources. The sonic data taken by the sonic tool (230) and received by the computer processor (234) may be processed according to instructions accessible to the computer processor (234) to perform the methods described above to determine first breaks and formation slowness. The calculation of formation slowness is preferably performed by the computer processor (234) at the well-site, although the computations may be done at an off-site processing location using the sonic data collected by the sonic tool (230).

The preferred embodiments were chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of taking measurements relating to a subterranean formation, comprising:
   generating acoustic waves;
   receiving at least one waveform including a component signal of interest portion;
   quality checking first arrival locations for the received waveform;
   determining the model order of an autoregressive model using Bayesian Information Criterion;
   determining a maximum likelihood function, based on the coefficients of the autoregressive model, within the signal of interest portion;
   determining a statistical function comprising the maximum likelihood function based on the coefficients of the autoregressive model;
   determining a point along the waveform using the statistical function;
   outputting a position of first arrival of the signal of interest, wherein the measurements taken are logging measurements relating to subterranean hydrocarbon reservoirs,
   wherein the quality checking comprises evaluating at least one of inconsistency of the received waveform having a clipped waveform, a signal-to-ratio of the received waveform and a spike in the received waveform before the determining a point along the waveform using the statistical function,
   wherein the evaluating comprises defining a reference waveform, using the reference waveform to compute a coherence ratio for each of the at least one waveform, and comparing the coherence ratio with a predetermined threshold to determine the inconsistency.

2. A method of taking measurements relating to a subterranean formation according to claim 1, further comprising roughly locating the point along the waveform using a localization function.

3. A method of taking measurements relating to a subterranean formation according to claim 1, wherein the first arrival of the signal of interest is detected at a plurality of locations.

4. A method of taking measurements relating to a subterranean formation according to claim 1, further comprising estimating formation slowness based on the located first arrival of the signal of interest.

5. A method of taking measurements relating to a subterranean formation according to claim 1, wherein the measurements are waveforms and the method further comprises:
   receiving the waveforms including the component signal of interest portion;
   determining the point of first arrival along each waveform, wherein before the point is a noise portion and after the point contains the signal of interest portion.

6. A method of taking measurements relating to a subterranean formation according to claim 1, further comprising:
   generating acoustic waves with a source;
   receiving acoustic waveforms with a plurality of receivers.

7. A method of taking measurements relating to a subterranean formation according to claim 1, further comprising:
   generating acoustic waves;
   receiving acoustic waveforms;
   estimating slowness based on the first arrival travel times and intra-receiver spacing of a logging tool;
   characterizing slowness for zones of a formation based on the slowness estimate;
   semblance processing the acoustic waveforms accounting for the zone slowness characterization.

8. A method of taking measurements relating to a subterranean formation according to claim 1, comprising a logging-while-drilling operation.

9. A method of taking measurements relating to a subterranean formation according to claim 1, further comprising:
   generating acoustic waves;
   receiving acoustic waveforms;
   windowing the acoustic waveforms based on an energy ratio computation multiplied by a regularization factor to damp late arrival signals.

10. A method of taking measurements relating to a subterranean formation according to claim 1, wherein:
   the point determined along the waveform is defined by:

$$First_{break} = \min[BIC(p_2)],$$

wherein $BIC(p_2) = 2 * \log[\text{maximisedlikelihood}] - 2(p_2) \log N$, where N is the number of samples considered and $p_2$ is the first break of interest.

* * * * *